(12) United States Patent  
Freydina et al.

(10) Patent No.: US 7,658,828 B2
(45) Date of Patent: Feb. 9, 2010

(54) REGENERATION OF ADSORPTION MEDIA WITHIN ELECTRICAL PURIFICATION APPARATUSES

(75) Inventors: Evgeniya Freydina, Acton, MA (US); Aytac Sezgi, Bedford, NH (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 847 days.

(21) Appl. No.: 11/104,791

(22) Filed: Apr. 13, 2005

(65) Prior Publication Data

US 2006/0231495 A1   Oct. 19, 2006

(51) Int. Cl.
*B01D 61/48* (2006.01)
(52) U.S. Cl. .................... 204/519; 204/524; 204/533; 204/536; 204/628; 204/632
(58) Field of Classification Search .............. 204/524, 204/533, 536, 632, 519, 628
See application file for complete search history.

(56) References Cited

U.S. PATENT DOCUMENTS

| | | | |
|---|---|---|---|
| 2,514,415 | A | 7/1950 | Rasch |
| 2,681,319 | A | 6/1954 | Bodamer |
| 2,681,320 | A | 6/1954 | Bodamer |
| 2,788,319 | A | 4/1957 | Pearson |
| 2,794,777 | A | 6/1957 | Pearson |
| 2,815,320 | A | 12/1957 | Kollsman |
| 2,840,052 | A | 6/1958 | Karassik |
| 2,854,394 | A | 9/1958 | Kollsman |
| 2,923,674 | A | 2/1960 | Kressman |
| 2,943,989 | A | 7/1960 | Kollsman |
| 3,014,855 | A | 12/1961 | Kressman |
| 3,074,864 | A | 1/1963 | Gaysowski |
| 3,099,615 | A | 7/1963 | Kollsman |
| 3,148,687 | A | 9/1964 | Dosch |
| 3,149,061 | A | 9/1964 | Parsi |

(Continued)

FOREIGN PATENT DOCUMENTS

AU   B-18629/92   10/1992

(Continued)

OTHER PUBLICATIONS

ASTM, "Standard Practice for Calculation and Adjustment of the Langelier Saturation Index for Reverse Osmosis," Designation: D3739-94 (Reapproved 1998), pp. 1-4.

(Continued)

*Primary Examiner*—Arun S Phasge

(57) ABSTRACT

The present disclosure generally relates to methods, systems, and devices for electrically purifying liquids containing species such as minerals, salts, ions, organics, and the like. One aspect of the invention provides methods of regenerating media within an electrical purification device, for example, exposing the media to one or more eluting solutions, and/or selectively desorbing ions, organics, and/or other species from the media by exposing the media to certain eluting conditions. In yet another aspect, methods of selectively removing one or more ions, organics, and/or other species from a liquid to be purified are provided, e.g., by selective removal of one or more ions, or organics, and the like from solution that can easily precipitate, and/or cause scaling or fouling to occur. In still another aspect, the invention provides a method of treating a solution containing ions, organics, and/or other species using an electrical purification apparatus in a continuous or semi-continuous fashion, while also performing regeneration of media contained within the apparatus.

26 Claims, 20 Drawing Sheets

U.S. PATENT DOCUMENTS

| | | |
|---|---|---|
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno et al. |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux et al. |
| 5,240,579 A | 8/1993 | Kedem |
| 5,254,227 A | 10/1993 | Cawlfield et al. |
| 5,259,936 A | 11/1993 | Ganzi |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,397,445 A | 3/1995 | Umemura et al. |
| 5,411,641 A | 5/1995 | Trainham, III et al. |
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A * | 4/1998 | Gallagher et al. ........... 204/524 |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,928,807 A | 7/1999 | Elias |

| | | | | | |
|---|---|---|---|---|---|
| 5,954,935 A | 9/1999 | Neumeister et al. | DE | 4238532 | 5/1994 |
| 5,961,805 A | 10/1999 | Terada et al. | DE | 44 18 812 A1 | 12/1995 |
| 5,980,716 A | 11/1999 | Horinouchi et al. | DE | 199 42 347 A1 | 3/2001 |
| 6,056,878 A | 5/2000 | Tessier et al. | EP | 0 503 589 A1 | 9/1962 |
| 6,099,716 A | 8/2000 | Molter et al. | EP | 0170895 B1 | 2/1986 |
| 6,126,805 A | 10/2000 | Batchelder et al. | EP | 0417506 | 3/1991 |
| 6,149,788 A | 11/2000 | Tessier et al. | EP | 0 621 072 A2 | 10/1994 |
| 6,171,374 B1 | 1/2001 | Barton et al. | EP | 0 621 072 B1 | 10/1994 |
| 6,187,162 B1 | 2/2001 | Mir | EP | 0 680 932 B1 | 11/1995 |
| 6,190,528 B1 | 2/2001 | Li et al. | EP | 0803474 A2 | 10/1997 |
| 6,190,558 B1 | 2/2001 | Robbins | EP | 0 870 533 A1 | 10/1998 |
| 6,193,869 B1 | 2/2001 | Towe et al. | EP | 1 068 901 A2 | 1/2001 |
| 6,197,174 B1 | 3/2001 | Barber et al. | EP | 1075 868 A2 | 2/2001 |
| 6,214,204 B1 | 4/2001 | Gadkaree et al. | EP | 1 101 790 A1 | 5/2001 |
| 6,228,240 B1 | 5/2001 | Terada et al. | EP | 1 106 241 A1 | 6/2001 |
| 6,235,166 B1 | 5/2001 | Towe et al. | EP | 1129765 | 9/2001 |
| 6,248,226 B1 | 6/2001 | Shinmei et al. | EP | 1172145 A2 | 1/2002 |
| 6,254,741 B1 | 7/2001 | Stuart et al. | EP | 1222954 A1 | 7/2002 |
| 6,258,278 B1 | 7/2001 | Tonelli et al. | EP | 1388595 A1 | 2/2004 |
| 6,267,891 B1 | 7/2001 | Tonelli et al. | EP | 1506941 A1 | 2/2005 |
| 6,274,019 B1 | 8/2001 | Kuwata | EP | 1762546 A1 | 3/2007 |
| 6,284,124 B1 | 9/2001 | DiMascio et al. | GB | 776469 | 6/1957 |
| 6,284,399 B1 | 9/2001 | Oko et al. | GB | 877239 | 9/1961 |
| 6,296,751 B1 | 10/2001 | Mir | GB | 880344 | 10/1961 |
| 6,303,037 B1 | 10/2001 | Tamura et al. | GB | 893051 | 4/1962 |
| 6,365,023 B1 | 4/2002 | De Los Reyes et al. | GB | 942762 | 11/1963 |
| 6,391,178 B1 | 5/2002 | Garcia et al. | GB | 1048026 | 11/1966 |
| 6,402,916 B1 | 6/2002 | Sampson et al. | GB | 1137679 | 12/1968 |
| 6,402,917 B1 | 6/2002 | Emery et al. | GB | 1318036 | 5/1973 |
| 6,482,304 B1 | 11/2002 | Emery et al. | GB | 1 381 681 A | 1/1975 |
| 6,495,014 B1 | 12/2002 | Datta et al. | GB | 1448533 | 9/1976 |
| 6,607,647 B2 | 8/2003 | Wilkins et al. | GB | 2278069 | 11/1994 |
| 6,607,668 B2 | 8/2003 | Rela | GB | 2303802 | 3/1997 |
| 6,649,037 B2 | 11/2003 | Liang et al. | JP | 54-5888 | 1/1979 |
| 6,726,822 B2 | 4/2004 | Garcia et al. | JP | 07-155750 | 6/1995 |
| 6,766,812 B1 | 7/2004 | Gadini | JP | 07-265865 | 10/1995 |
| 6,824,662 B2 | 11/2004 | Liang et al. | JP | 09-253643 | 9/1997 |
| 6,896,814 B2 | 5/2005 | Chidambaran et al. | JP | 11-42483 | 2/1999 |
| 2001/0003329 A1 | 6/2001 | Sugaya et al. | JP | 2001-79358 | 3/2001 |
| 2002/0092769 A1 | 7/2002 | Garcia et al. | JP | 2001-79553 | 3/2001 |
| 2002/0104804 A1 | 8/2002 | Grott | JP | 2001-104960 | 4/2001 |
| 2003/0034292 A1 | 2/2003 | Rela | JP | 2001-113137 | 4/2001 |
| 2003/0080467 A1 | 5/2003 | Andrews et al. | JP | 2001-113279 | 4/2001 |
| 2003/0089609 A1 | 5/2003 | Liang et al. | JP | 2001-113280 | 4/2001 |
| 2003/0098266 A1 | 5/2003 | Shiue et al. | JP | 2001-121152 | 5/2001 |
| 2003/0155243 A1 | 8/2003 | Sferrazza | JP | 2005-007347 | 1/2005 |
| 2003/0201235 A1 | 10/2003 | Chidambaran et al. | JP | 2005-007348 | 1/2005 |
| 2004/0035802 A1 | 2/2004 | Emery et al. | RO | 114874 B1 | 8/1999 |
| 2004/0079700 A1 | 4/2004 | Wood et al. | RU | 216622 | 11/1972 |
| 2005/0016932 A1 | 1/2005 | Arba et al. | RU | 990256 | 1/1983 |
| 2005/0103622 A1 | 5/2005 | Jha et al. | RU | 1118389 | 10/1984 |
| 2005/0103630 A1 | 5/2005 | Ganzi et al. | RU | 2004137231 | 10/2006 |
| 2005/0103631 A1 | 5/2005 | Freydina et al. | WO | 92/11089 A1 | 7/1992 |
| 2005/0103644 A1 | 5/2005 | Wilkins et al. | WO | 95/32052 A1 | 11/1995 |
| 2005/0103717 A1 | 5/2005 | Jha et al. | WO | 95/32791 A1 | 12/1995 |
| 2005/0103722 A1 | 5/2005 | Freydina et al. | WO | 96/22162 A1 | 7/1996 |
| 2005/0103723 A1 | 5/2005 | Wilkins et al. | WO | 97/25147 A1 | 7/1997 |
| 2005/0103724 A1 | 5/2005 | Wilkins et al. | WO | 97/46491 A1 | 12/1997 |
| 2005/0109703 A1 | 5/2005 | Newenhizen | WO | 97/46492 A1 | 12/1997 |
| 2005/0121388 A1 | 6/2005 | Wood et al. | WO | 98/11987 A1 | 3/1998 |
| 2005/0263457 A1 | 12/2005 | Wilkins et al. | WO | 98/17590 A1 | 4/1998 |
| 2006/0060532 A1 | 3/2006 | Davis | WO | 98/20972 A1 | 5/1998 |
| 2006/0157422 A1 | 7/2006 | Freydina et al. | WO | 98/58727 A1 | 12/1998 |
| 2008/0067069 A1 | 3/2008 | Gifford et al. | WO | 99/39810 A1 | 8/1999 |
| | | | WO | 00/30749 | 6/2000 |
| FOREIGN PATENT DOCUMENTS | | | WO | 00/64325 A2 | 11/2000 |
| | | | WO | 00/75082 A1 | 12/2000 |
| CA | 2316012 A1 | 11/2001 | WO | 01/49397 A1 | 7/2001 |
| CN | 104411 A | 8/1990 | WO | 02/04357 A1 | 1/2002 |
| DE | 1 201 055 | 9/1965 | WO | 02/14224 A1 | 2/2002 |
| DE | 2708240 | 8/1978 | WO | 03053859 | 7/2003 |
| DE | 3238280 A1 | 4/1984 | WO | 03/086590 A1 | 10/2003 |
| DE | 4016000 A1 | 11/1991 | WO | 2004106243 | 12/2004 |

WO 2005087669 9/2005

OTHER PUBLICATIONS

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

Dimascio et al., "Continuous Electrodeionization: Production of High-Purity Water without Regeneration Chemicals," The Electrochemical Society *Interface*, Fall 1998, pp. 26-29.

Dimascio et al., "Electrodiaresis Polishing (An Electrochemical Deionization Process)," 1994, pp. 164-172.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

Dupont "Nafion Perfluorinated Membranes, Technical Information, Safety in Handling and Use," Nov. 1993, 4 pages.

Farmer et al., Capacitive Deionization of $NH_4ClO_4$ Solutions with Carbon Aerogel Electrodes, *J. Appl. Electro-Chemistry*, vol. 26, (1996), pp. 1007-1018.

FDA, "Guide to Inspections of High Purity Water Systems," printed from www.fda.gov. on Dec. 28, 2001.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.-I.Chem.E. Symposium Series No. 9, 1965 (London: Instn chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, Jul. 17, 1998.

Matejka, "Continuous Production of High-Purity Water by Electro-Deionisation," *J. Appl. Chem., Biotechnol.*, vol. 21, Apr. 1971, pp. 117-120.

Pourcelly, Gerald, Conductivity and selectivity of ion exchange membranes: structure-correlations, *Desalination*, vol. 147 (2002) pp. 359-361.

Purolite Technical Bulletin, Hypersol-Macronet™ Sorbent Resins, 1995.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting in Ion Exchange Membranes," Pergamon Press Ltd., 1985, pp. 275-282.

R. Simons, "The Origin and Elimination of Water Splitting in Ion Exchange Membranes During Water Demineralisation By Electrodialysis," *Desalination*, vol. 28, Jan. 29, 1979, pp. 41-42.

USFilter, "H-Series Industrial CDI® Systems," product information, 1998, 4 pgs.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

Wood, J.H. et al., "Continuous Electrodeionisation: Module Design Considerations for the Production of High Purity Water," *Proc. Of IEX at the Millenium*, Jul. 16, 2000, pp. 44-51.

Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.

U.S. Appl. No. 11/524,080, filed Sep. 20, 2006, Wilkins, et al., Method and Apparatus for Desalination.

U.S. Appl. No. 11/474,299, filed Jun. 23, 2006, Freydina, Evgeniya, Electrically-Driven Separation Apparatus.

U.S. Appl. No. 11/524,078, filed Sep. 20, 2006, Ganzi, et al., Method and System for Irrigation.

U.S. Appl. No. 11/524,033, filed Sep. 20, 2006, Zuback, et al., Method and System for Providing Potable Water.

Hell et al., "Experience with full-scale electrodialysis for nitrate and hardness removal," Desalination 117, (1998) 173-180.

Del Pino et al., "Wastewater reuse through dual-membrane processes: opportunities for sustainable water resources," Desalination 124 (1999) 271-277.

Larchet et al., "Application of electromembrane technology for providing drinking water for the population of the Aral region," Desalination 149 (2002) 383-387.

Sirivedhin et al., "Reclaiming produced water for beneficial use: salt removal by electrodialysis," Journal of Membrane Science, 243 (2004) 335-343.

Ganzi, "Electrodeionization for high-purity water production," AIChE Symposium Series, No. 261, vol. 84, New Membrane Materials and Processes for Separation, edited by Sirkar, K.K. and Lloyd, pp. 73-83, 1988.

* cited by examiner

REGENERATION OF ADSORPTION MEDIA WITHIN ELECTRICAL PURIFICATION APPARATUSES

FIELD OF INVENTION

The present invention generally relates to methods, systems, and devices for purifying liquids via electrical purification and, more particularly, to methods, systems, and devices for purifying liquids containing minerals, salts, ions, organics, and the like, with an electrical purification device containing adsorption media that can be regenerated in the electrodeionization device.

DISCUSSION OF RELATED ART

Devices able to purify liquids using electrical fields are commonly used to treat water and other liquids containing dissolved ionic species. Two types of electrical purification devices are electrodialysis devices and electrodeionization devices. Within these devices are concentrating and diluting compartments separated by anion- and cation-selective membranes. An applied electric field causes dissolved ions to migrate through the anion- and cation-selective membranes, resulting in the liquid of the diluting compartment being depleted of ions, while the liquid in the concentrating compartment is enriched with the transferred ions. Typically, the liquid in the diluting compartment is desired (the "product" liquid), while the liquid in the concentrating compartment is discarded (the "reject" liquid). In an electrodeionization device, the diluting and concentration compartments also typically contain adsorption media, such as ion exchange resin. The ion exchange resin within the electrodeionization device may act as a path for ion transfer, and/or the ion exchange resin may serve as an increased conductivity bridge between the membranes to facilitate movement of ions within the electrodeionization device. Once the ion exchange resin has become saturated with adsorbed ionic species, the ion exchange has reached equilibrium; thus, no more net changes in concentration of ions adsorbed to the resin will occur. Typically, to extend the operational lifetime of the ion exchange resin, a pre-treatment step is performed (such as "pre-softening") to reduce the concentration of species within the entering liquid that can cause such scaling or fouling to occur. Additional descriptions of electrodeionization devices have been disclosed in, for example, Giuffrida et al. in U.S. Pat. Nos. 4,632,745; 4,925,541; and 5,211,823; by Ganzi in U.S. Pat. Nos. 5,259,936, and 5,316,637; by Oren et al. in U.S. Pat. No. 5,154,809; and by Towe et al. in U.S. Pat. No. 6,235,166.

In certain known operating regimens, an electrical purification device may occasionally be cleaned by exposing the device to solutions of relatively low concentrations of acid, brine, or caustic. Conventionally, cleaning is performed only when the device has become clogged or unusable for achieving desired water purity, for example, due to fouling of the resins. Such cleaning is designed and intended only to unclog the electrical purification device, and allow resumption of its operations. However, little, if any, regeneration of the resins is effected by such sporadic cleaning regimens.

SUMMARY OF INVENTION

The present disclosure generally relates to methods, systems, and devices for electrically purifying liquids containing species such as minerals, salts, ions, organics, and the like. The subject matter of this invention involves, in some cases, interrelated products, alternative solutions to a particular problem, and/or a plurality of different uses of one or more systems and/or articles.

In one set of embodiments, the method includes acts of providing an electrodeionization device comprising adsorption media within at least one compartment and regenerating at least a portion of the adsorption media within at least one compartment of the electrodeionization device prior to the adsorption media reaching its maximum adsorption capacity for at least one selected target species.

The method, in another set of embodiments, includes acts of providing an electrodeionization device containing adsorption media comprising adsorbed thereto at least one target species, exposing the adsorption media to a first desorption liquid comprising a regenerant species at a first concentration, and exposing the adsorption media to a second desorption liquid comprising the regenerant species at a second concentration, the desorption liquid able to remove the second target species from the adsorption media.

In another aspect, the invention comprises a system. The system, in one set of embodiments, includes an electrodeionization device configured to contain adsorption media, and a controller configured to facilitate desorption of a substantial fraction of a target ion adsorbed to the adsorption media by introducing a liquid into the electrodeionization device.

Other advantages and novel features of the invention will become apparent from the following detailed description of the various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For the purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
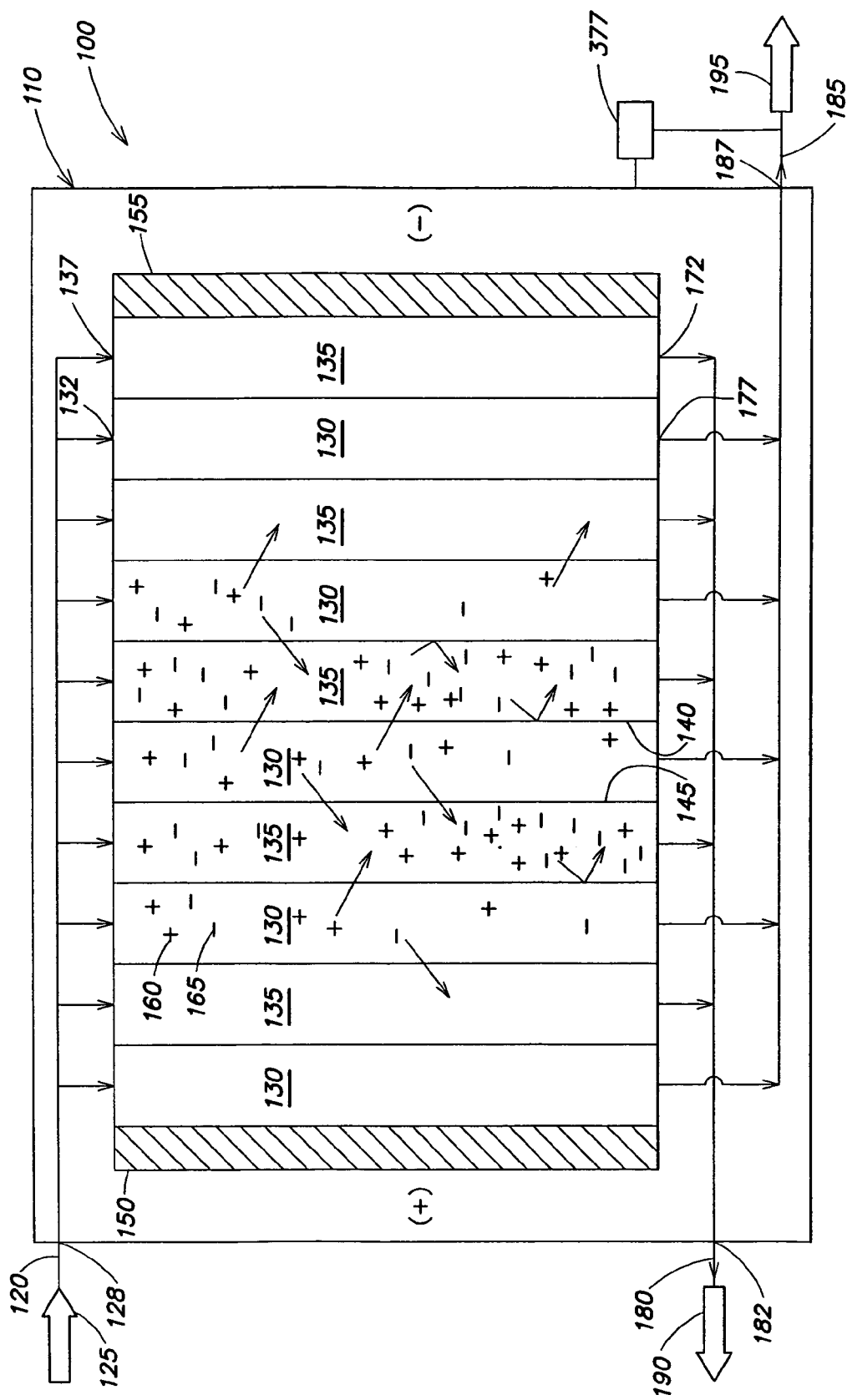
FIG. 1 is a schematic diagram illustrating an electrical purification apparatus, in accordance with one embodiment of the invention.

The present disclosure generally relates to methods, systems, and devices for electrically purifying liquids containing species such as minerals, salts, ions, organics, and the like, including methods of manufacture, promotion, and use of such methods, systems, and devices. One aspect of the invention provides an electrical purification apparatus. The electrical purification apparatus can include an electrodeionization device. The electrodeionization device may be operated in any suitable fashion, for example, continuously or essentially continuously, intermittently, upon demand, etc. In some cases, the electrodeionization device may be operated with periodic reversals of polarity, for example, as described by Gallagher, et al. in U.S. Pat. No. 5,558,753, which is incorporated herein by reference. In another aspect, methods of regenerating media within an electrical purification device, and systems designed and configured to implement such methods, are provided. For example, in certain embodiments, regeneration of media contained in an electrical purification device of the invention is effected by exposing the media to one or more eluting solutions, for example, salt solutions, and/or by selectively desorbing ions, organics, and/or other species from the media by exposing the media to selected eluting conditions, as described in more detail below. In yet another aspect, methods of selectively removing one or more ions, organics, and/or other species from a liquid to be purified, to an extent that differs from the extent of removal of another species, are provided, e.g., by selective removal of one or more ions, or organics, etc. from solution that can easily precipitate, and/or cause scaling or fouling to occur. In still another aspect, the invention provides a method of treating a solution containing ions, organics, and/or other species using an electrical purification apparatus in a continuous or semi-continuous fashion, while also performing regeneration of media contained within the apparatus.

As used herein, an "electrical purification" device is able to purify a liquid containing one or more species (for example, ions) dissolved and/or suspended therein by using an electrical field able to influence and/or induce transport or mobility of the dissolved and/or suspended species within the liquid (directly or indirectly) to at least partially effect separation of the liquid and the species. The one or more species dissolved and/or suspended in the liquid to be removed by the electrical purification device is also, in certain cases, referred to herein as a "target" species (further described below). An electrical purification apparatus is an apparatus including one or more electrical purification devices, and, optionally, other units associated with electrical purification device(s), e.g., pipes, pumps, tanks, control systems, electricity generation/supply/distribution systems, etc. (additional examples discussed below). Non-limiting examples of electrical purification devices include electrodialysis devices and electrodeionization devices. As used herein, the terms "electrodialysis" and "electrodeionization" are given their ordinary definitions as used in the art. An electrodialysis device typically has several compartments that are used to dilute or concentrate ions and/or other species in solution in a liquid. An electrodeionization device is similar to an electrodialysis device; but also includes solid "media" (e.g., adsorption media, such as ion exchange media) in one or more compartments within the device. The media is generally able to collect or discharge ionic and/or other species, e.g. by adsorption/desorption. The media may carry permanent and/or temporary electrical charge, and can operate, in some instances, to facilitate electrochemical reactions designed to achieve or enhance performance of the electrodeionization device, e.g. separation, chemisorption, physisorption, separation efficiency, etc. Examples of media include, but are not limited to, ion exchange media in formats such as particles, fibers, membranes, and the like. Such materials are well known in the art and are readily commercially available.

A "target species," as used herein, is a species dissolved and/or suspended in a liquid that is desired to be removed from a feed solution using an electrical purification device to produce a product solution. Generally, adsorption media utilized in an electrical purification device is selected to have an affinity for target species, under at least certain operating conditions, that is greater than its affinity for, under the same conditions, non-target species in the feed solution. Examples of target species that are desirably removed from a liquid using certain electrical purification apparatuses of the invention include certain ionic species, organic molecules, other weekly ionized substances, and organisms, in some cases. Target ionic species that are desirably removed can be one or more ions able to precipitate from solution, and/or are able to react with other species and/or ions in a solution to form salts and/or other compounds that are able to precipitate from solution, so as to cause substantial scaling during operation of an electrical purification apparatus, i.e., the formation of a substantially insoluble deposit (a "scale").

A "non-precipitatable ion" or "non-target ion" as used herein, refers to an ion that is not commonly able to precipitate from solution or to react with other species and/or ions in a solution to form salts and/or other compounds able to precipitate from solution, so as to cause substantial scaling, at concentrations encountered in operation of electrical purification apparatuses. For example, $Na^+$, $Cl^-$, $K^+$, $OH^-$, and $H^+$ comprise a non-inclusive list of non-precipitatable ions. Such "non-precipitatable ions" or "non-target ions" may comprise examples of a "matrix species," which refers, generally, to a species that is dissolved and/or suspended in a liquid and to which an adsorption media in an electrical purification device of certain embodiments of the invention has a lower affinity than its affinity for "target species" under a particular set of selected conditions. In certain embodiments, as described in greater detail below, matrix species and adsorption media may be selected such that the one or more matrix species comprises an "eluant" or "regenerant" species. An "eluant" or "regenerant" species, as used herein, typically has an affinity to an adsorption media contained with an electrical purification device that is less than that of the target species, but, when present in sufficiently high concentrations, is able to force the target species to desorb from the adsorption media. As used herein, "substantial scaling" refers to conditions in which the formation of scaling deposits created by target ionic species adversely affects the proper functioning and performance of the electrical purification apparatus. A scaling deposit is usually substantially insoluble, i.e., a deposit that does not substantially lose its mass (i.e., dissolve) when left undisturbed and exposed to pure water under ambient conditions for extended periods of time, for example, at least a day. For example, a substantially insoluble deposit may retain at least about 95% of its initial mass after being left undisturbed and exposed to pure water for a day under ambient conditions.

Non-limiting examples of target ionic species ions can include $Ca^{2+}$, $Mg^{2+}$, $Si^{4+}$, $Cu^{2+}$, $Al^{3+}$, $Fe^{3+}$, $Mn^{2+}$, $Pb^{3+}$, $Pb^{4+}$, $SO_4^{2-}$, $SiO_4^{2-}$, $HCO_3^-$, and the like, as well as combinations of any two or more of these, for example, $Ca^{2+}$ and $Mg^{2+}$, $Ca^{2+}$ and $Fe^{3+}$, $Mg^{2+}$ and $Fe^{3+}$, $Mg^{2+}$ and $Pb^{3+}$, and the like. Typical, non-limiting concentrations of target ionic species in feed water include: at least about 50 mg/l or more, at least about 60 mg/l or more, at least about 70 mg/l or more, at least about 80 mg/l or more, at least about 90 mg/l or more, at least about 100 mg/l or more, at least about 110 mg/l or more, at least about 120 mg/l or more, at least about 130 mg/l or more, at least about 140 mg/l or more, at least about 150 mg/l or more, at least about 160 mg/l or more, at least about 170 mg/l or more, at least about 180 mg/l or more, at least about 190 mg/l or more, at least about 200 mg/l or more, at least about 250 mg/l or more, or at least about 500 mg/l or more.

As used herein, the "hardness ions" are $Ca^{2+}$ and $Mg^{2+}$. Hardness ions are examples of typical target ionic species, in certain embodiments. Also, as used herein, "hard water" is water (or an aqueous solution) containing a substantial amount of one or more of the hardness ions, typically in amounts that enable substantial scaling to occur (often referred to, in the aggregate, as the "hardness" of the water). For example, hard water may have a hardness of at least about 50 mg/l of one or more types of hardness ions present, and in some cases, at least about 75 mg/l, at least about 100 mg/l, at least about 125 mg/l, at least about 150 mg/l, at least about 175 mg/l (10 gr/gal (grains per gallon)), at least about 200 mg/l, at least about 225 mg/l, or at least about 250 mg/l or more in some cases. As another example, the hard water may have a hardness of at least about 10 ppm of one or more types of harness ions, and in some cases, at least about 20 ppm, at least about 25 ppm, at least about 50 ppm, at least about 75 ppm, or at least about 100 ppm of one or more types of hardness ions present. In some cases, a target ionic species may be weekly ionizable, such as, for example, silica.

Another example of a target species, in certain embodiments, is an organic molecule, which may be naturally occurring and/or otherwise present within the liquid, for example, as a pollutant. Non-limiting examples of organic molecules that may be target species include naturally-formed organic acids, such as humic acid, fulvic acid, ulmic acids, or the like, which, in some cases, may be created through the degradation of organic of organic matter. Other examples of target organic molecules to be removed include non-naturally occurring organic molecules, for example, pesticides, herbicides, endocrine disruptors, caffeine, hormones or hormone analogs, hydrocarbons (for example, gasolines or oils), or the like. Other examples of target organic species may include by products of organisms, such as bacterial endotoxins, enzymes, proteins, or the like. In certain cases, the target organic species may include entire organisms, such as viruses, bacteria, cysts, oocysts, or the like.

An "organic" or an "organic material," or an "organic compound," or an "organic molecule," as used herein, are given their ordinary meanings as used in the art, e.g., one or more carbon-containing compounds, such as may comprise a target organic species. Of particular importance in the context of embodiments of the invention involving water purification are organics that are typically present in many commonly utilized sources of water (for example, from a natural source). Organics, depending on their nature and composition, may be present in a non-ionized, or in an ionized form, i.e., positively charged or negatively charged. Typically, organics arise from biological sources. In some cases, e.g., if multiple organics are present, the organic compounds need not each be individually specified, and can, instead, be referred to in the aggregate.

For example, the "total organic carbon" (or "TOC") in a liquid may be readily identified or studied without necessarily specifically identifying or characterizing every organic compound present, as is known to those of ordinary skill in the art. As used herein, the "total organic carbon" (or "TOC") is defined by the total amount of one or more ionizable organic compounds in solution. An "ionizable" organic compound is an organic compound that can ionize in solution (i.e., has the ability to exist in solution in an ionized form, optionally in equilibrium with a non-ionized form) under standard conditions (i.e., 25° C. and 1 atm pressure, in the absence of a sustained electric field). Those of ordinary skill in the art will be able to determine the degree of ionization that a particular species undergoes in solution under standard conditions. When multiple ionizable organic compounds are present in solution, the organic compounds need not each be individually specified, and can, instead, be referred to in the aggregate. Thus, the TOC of a liquid may be identified and/or studied without necessarily specifically identifying or characterizing every or any particular, ionizable organic compound present. In some cases, the organic material may also ionize (or be further ionized) during operation of the electrodeionization device, for example, when the organic material is exposed to an electric field of at least about 100 V/m. Those of ordinary skill in the art will know of suitable techniques for determining concentrations of organic compounds and/or TOC concentrations in a liquid. For example, a concentration of an organic compound and/or a TOC concentration of a liquid can be determined using a gas chromatography/mass spectrometry system ("GC/MS"), or a TOC analyzer, i.e., a device which oxidizes a substrate and determines conductivity.

FIG. 1 illustrates an electrical purification apparatus usable for practicing the invention, according to one embodiment. In this figure, electrical purification apparatus 100 includes electrodeionization device 110. In other embodiments, electrical purification apparatuses may include, instead of or in addition to the illustrated electrodeionization device, other devices, such as electrodialysis devices and/or additional electrodeionization devices, etc. In FIG. 1, a liquid to be purified 120 originating from point of entry 125 enters electrodeionization device 110 through inlet 128. Within electrodeionization device 110, liquid 120 enters a series of compartments 130, 135 though respective inlets 132, 137. Compartments 130, 135 are separated by ion-selective membranes 140, 145. In the embodiment shown in FIG. 1, the ion-selective membranes are arranged as an altering series of "cation-selective membranes" 140 (i.e., membranes that preferentially allow cations to pass therethrough, relative to anions) and "anion-selective membranes" 145 (i.e., membranes that preferentially allow anions to pass therethrough, relative to cations). Of course, in certain cases, other types and/or arrangements of membranes can also be used, e.g., as further described below. An electric field may be imposed on compartments 130, 135 through electrodes 150, 155. In some cases, the imposed electric field is controlled as desired, for example, the electric field strength may be constant, altered in response to a measurement (such as in response to a sensor measurement, e.g., pH, resistivity, concentration of an ion or other species, for instance, calcium or sodium), periodically reversed, activated and/or deactivated upon demand, etc.

In the example shown in FIG. 1, within electrodeionization device 110, electrode 150 can be positively charged, while electrode 155 can be negatively charged. The electric field created by electrodes 150, 155 facilitates migration of charged species such as ions from within diluting compartments 130 through ion-selective membranes 140 into concentrating compartments 135. Concentrate liquid 180 exits concentrating compartments 135 through outlets 172, then exits electrodeionization device 110 through outlet 182 (optionally proceeding to further operations within electrical purification apparatus 100), for example, to a point of use 190, to be disposed of, etc. Similarly, purified liquid 185 exits diluting compartments 130 through outlets 177, then exits electrodeionization device 110 through outlet 187 (optionally proceeding to further operations within electrical purification apparatus 100), for example, to a point of use 195, etc.

Liquid 120 entering electrical purification apparatus 100 may be any liquid where separation of the liquid into a "concentrated" portion (containing a higher concentration of dissolved and/or suspended species, i.e., ions, organics, etc. relative to entering liquid 120) and an "purified" portion (i.e., containing a lower concentration of dissolved and/or suspended species, i.e., ions, organics, etc., relative to entering liquid 120) is desired. For example, liquid 120 may be an organic liquid and/or an aqueous solution, such as a source of less than completely pure water, for example fresh water, salt water, wastewater, etc. As another example, liquid 120 may originate from a unit operation producing a liquid and/or operating on a liquid, such as, but not limited to, unit operations for ultrafiltration, nanofiltration, sedimentation, distillation, humidification, reverse osmosis, dialysis, extraction, chemical reactions (e.g., where a liquid is generated), heat and/or mass exchange, or the like. In certain embodiments, the liquid may originate from a reservoir, such as a storage vessel, a tank, or a holding pond, etc., or, in the case of water, from a natural or artificial body of water, such as a lake, a river, a pond, a channel, an ocean, etc. Between point of entry 125 and electrodeionization device 110 may be none, as in certain embodiments described further below, or any number of additional operations or distribution networks that may operate on the liquid. For example, in certain embodiments, reverse osmosis, filtration such as microfiltration or nanofiltration, sedimentation, an activated carbon filter, an electrodialysis device or an electrodeionization device, a reservoir, etc. may be included. In some cases, the liquid may be supplied to the electrodeionization device from an external source; for example, the source of liquid may be placed in fluid communication with the electrodeionization device and/or with the media contained within the electrodeionization device.

Points of use 190 and/or 195 each may be locations where a liquid exits the electrical purification apparatus. In some cases, a point of use is any location in which a liquid is desired. For example, a point of use may be a spigot, a reservoir, a sewer, a heat exchanger, or a unit operation in which a liquid is needed, such as may be found in a cooling system, a refrigeration system, a manufacturing plant, a chemical plant, or the like. The liquid from the point of use may also be used in equipment that is able to purify and/or store the liquid, for example, in bottles or a tank. The point of use may also be a city, or a building such as a house or an apartment complex, or the point of use may be a discharge to the natural environment. Between the outlets of the electrodeionization device and a point of use may be none or any number of additional unit operations and/or storage/distribution components, for example, filtration operations such as ultrafiltration or nanofiltration, reverse osmosis operations, sedimentation, an electrodialysis or an electrodeionization device, a reservoir, and the like.

In FIG. 1, compartments 130, 135 in electrodeionization device 110 each may have any suitable number of inlets and outlets and any suitable configuration able to allow liquid to flow therethrough. Ion-selective membranes 140, 145 may be selected to allow a charged species, such as an ion, having one charge to pass through but restrict or inhibit (partially or totally) the passage of a charged species, such as an ion, carrying the opposite charge therethrough. For example, the ion-selective membrane may allow passage therethrough of ions such as $Na^+$, $HCO_3^-$, or $Cl^-$. In some cases, the membrane may also prevent passage of organics therethrough. As used herein, an "ion" is any species having an electrical charge, for example, an atomic species (e.g., $Na^+$, $K^+$, $Cl^-$, $F^-$, $Ca^{2+}$, $Mg^{2+}$, etc.), a molecular species (e.g., $HCO_3^-$, $CO_3^{2-}$, $SO_4^{2-}$, etc.), an ionized organic compound, or the like. Ions are usually at least partially soluble in aqueous solution.

In one set of embodiments, the electrodeionization device may include one or more membranes, for example, but not limited to, ion-selective membranes, neutral membranes, size-exclusion membranes, a membrane that is specifically impermeable to one or more specific ions or other species, etc. In some cases, an alternating series of cation- and anion-selective membranes is used within the electrodeionization device. The ion-selective membranes may be any suitable membrane that can preferentially allow at least one ion to pass therethrough, relative to another ion. Those of ordinary skill in the art will be able to identify suitable ion-selective membranes, a wide variety of which are commercially available.

In certain embodiments, one or more of compartments 130, 135 are filled with media such as adsorption media, for example, ion exchange media. The ion exchange media, in some embodiments, can include resins such as known ion exchange resins, for example, a cation resin (i.e., a resin that preferentially adsorbs cations), an anion resin (i.e., a resin that preferentially adsorbs anions), an inert resin, mixtures thereof, or the like. In some cases, one or more compartments may be filled with only one type of resin (e.g., a cation resin or an anion resin); in other cases, the compartments may be filled with more than one type of resin (e.g., two types of cation resins, two types of anion resins, a cation resin and an anion resin, etc.). Examples of adsorption media include an acrylic gel resin, such as SF-120 cation resin and IRA-458 anion resin (both from Rohm and Haas, Philadelphia, Pa.). The media contained within the compartments may be present in any suitable shape or configuration, for example, as substantially spherical and/or otherwise shaped discrete particles, powders, fibers, mats, membranes, extruded screens, clusters, and/or preformed aggregates of particles (for example, resin particles may be mixed with a binding agent to form particle clusters), etc. In some cases, the media may include multiple shapes or configurations, for example, particles and membranes. The media may comprise any material suitable for adsorbing ions, organics, and/or other species from a liquid, depending on the particular application, for example, silica, a zeolite, and/or any one or mixture of a wide variety of polymeric ion exchange media that are commercially available and whose properties and suitability for the particular application are well known to those skilled in the art. Other materials and/or media may additionally be present within the compartments, for example, that are able to catalyze reactions, filter suspended solids in the liquid being treated, or the like.

It will also be understood by those of ordinary skill in the art that a variety of configurations may exist within compartments 130, 135. For instance, a compartment may contain additional components and/or structure than that illustrated, such as, for example, baffles, meshes, plates, ribs, straps, screens, pipes, carbon particles, carbon filters, and the like, which may be used, for example, to contain the ion exchange media, control liquid flow, and the like. The components may each contain the same type and or/number of the various components and/or be of the same configuration or may have different components and/or structure/configurations.

The media, in certain embodiments of the invention, is selected so that it can adsorb one or more target species from solution, for example, $Ca^{2+}$, $Mg^{2+}$, $HCO_3^-$, as previously described. In some cases, the media may be selected to preferentially adsorb one or more target species from solution, relative to other, non-precipitatable or non-target ions. For example, the media may be selected to preferentially adsorb $Ca^{2+}$ ions, relative to $Na^+$ ions. As another example, the media may be selected to preferentially remove $HCO_3^-$ ions from solution, relative to $Cl^-$ ions. In some embodiments, the media may be chosen such that the media is able to preferentially adsorb at least about three times as many target species from solution, relative to a non-target species (molar basis), and in some cases, at least about four times, at least about five times, or at least about six times, relative to a non-target species. In some cases, a feed liquid may be purified within the electrical purification apparatus to produce a stream of purified liquid having less than about 50 ppm, less than about 30 ppm, less than about 10 ppm, less than about 5 ppm, less than about 3 ppm, less than about 1 ppm, or less than about 500 ppb of one or more target species. In some cases, the total concentration of target species in the purified liquid may be less than about 50 ppm, less than about 30 ppm, less than about 10 ppm, less than about 5 ppm, less than about 3 ppm, less than about 1 ppm, or less than about 500 ppb.

In these or other embodiments, a feed liquid may be purified such that at least about 50%, at least about 60%, at least about 70%, at least about 75%, at least about 80%, at least about 85%, at least about 90%, at least about 95%, at least about 97%, or at least about 99% or more of one or more target species (for example, a hardness ion) is removed from the feed liquid. In some cases, at least about 50%, at least about 60%, at least about 70%, at least about 75%, at least about 80%, at least about 85%, at least about 90%, at least about 95%, at least about 97%, or at least about 99% or more of all of the target species may be removed from the feed liquid. In certain instances, a feed liquid may be purified to produce a stream of purified water having an electrical resistivity of greater than about 0.1 megohm cm, greater than about 1 megohm cm, greater than about 3 megohm cm, greater than about 6 megohm cm, greater than about 9 megohm cm, greater than about 12 megohm cm, greater than about 15 megohm cm, or at least about 18 megohm cm.

In some embodiments of the invention, the media may preferentially remove certain target species from solution, relative to other target species or other matrix species, such as non-precipitatable ions. Thus, the media may be able to remove a first fractional amount of a first ion (or other species) and a second fractional amount of a second ion (or other species) from a liquid to be purified, where the first fractional amount and the second fractional amount are different. For example, the media may preferentially remove about 50%, about 60%, about 70%, about 80%, about 85%, about 90%, about 95%, about 97%, about 98%, about 99%, or about 100% of a particular target species from solution, while removing only about 30% or less, about 40% or less, about 50% or less, about 60% or less, about 70% or less, about 80% or less, about 90% or less, about 95% or less, or about 99% or less of the another species from solution. In other words, so long as the media is able to remove a greater percentage of the target species from solution, as compared to the percentage of the other species removed from solution, preferential removal of the target species occurs. Thus, for example, a media may be able to preferentially remove a target species by removing 90% of a target species and 80% of a non-target species, such as a non-precipitatable ion, from solution. As another example, a media may preferentially adsorb hardness ions such as calcium ions, magnesium ions, etc. from solution, relative to non-target species, such as non-precipitatable ions, for example, such as sodium ions or potassium ions.

In certain embodiments, an adsorption media may be utilized that is selected to be able to remove certain target organic species from solution. For instance, in some cases, a feed liquid including such target organic species may be purified within an electrical purification apparatus of an embodiment of the invention to produce a stream of purified liquid having less than about 1 ppm, less than about 500 ppb, less than about 100 ppb, less than about 50 ppb, less than 10 ppb, less than about 5 ppb, or less than about 1 ppb of at least one organic compound (or TOC) in solution. In other embodiments, a feed liquid including such target organic species may be purified such that at least about 50%, at least about 60%, at least about 70%, at least about 75%, at least about 80%, at least about 85%, at least about 90%, at least about 95%, at least about 97%, 99%, 99.5%, 99.9%, 99.99%, or more of at least one organic compound (or of the TOC) in solution is removed from the feed liquid. The feed liquid including such target organic species may have, for example, at least about 1 ppm, at least about 3 ppm, or at least about 10 ppm or more of at least one organic compound (or TOC) in solution.

In one set of embodiments, during operation, an electric field is applied to the diluting and concentrating compartments from electrodes 150, 155, creating a potential gradient that facilitates migration of ions from the diluting compartments towards the concentrating compartments. The electric field may be applied essentially perpendicular to liquid flow within the electrodeionization device. The electric field may be substantially uniformly applied across the diluting and concentrating compartments, resulting in an essentially uniform, substantially constant electric field across the compartments; or in some cases, the electric field may be non-uniformly applied, resulting in a non-uniform electric field density across the compartments. In some embodiments of the invention, the polarity of the electrodes may be reversed during operation, reversing the direction of the electric field within the device, for example, as described by Gallagher, et al., in U.S. Pat. No. 5,558,753, or by Giuffrida, et al., in U.S. Pat. No. 4,956,071, issued Sep. 11, 1990, entitled "Electrodeionization Apparatus and Module," by Giuffrida, et al., both of which are incorporated herein by reference. Polarity reversals may be useful, for instance, to facilitate regeneration of media within the electrodeionization device while simultaneously effecting liquid purification, as further described below. Electrodes 150, 155 may each independently be made out of any material suitable for creating an electric field within the device. In some cases, the electrode material can be chosen such that the electrodes can be used, for example, for extended periods of time without significant corrosion or degradation. Suitable electrode materials and configurations are well known in the art.

Electrical purification apparatus 100 may also have include additional, non-illustrated, configurations and/or components, such as additional electrodes, piping configurations, unit operations, pumps, reservoirs, valves, stirrers, surge tanks, sensors, control elements, etc. whose function, utility, and placement would be apparent to those of ordinary skill in the art. In some cases, electrodeionization device 110 within electrical purification apparatus 100 can have other internal geometries than illustrated, for example, having cylindrical, rectangular, or spiral compartments. Different inlet and/or outlet configurations may also be used in certain cases within electrical purification apparatus 100 and/or electrodeionization device 110. It should therefore be understood that the systems and methods of the present invention may be used in connection with a wide variety of systems where the purification of one or more liquids may be desired; thus, the electrical purification apparatus may be modified by those of ordinary skill in the art as needed for a particular process, without departing from the scope of the invention.

In certain embodiments the invention, the electrical purification apparatus allows for the removal of a significant amount of dissolved and/or suspended organics from water or other liquids. For example, the electrical purification apparatus may include an electrodeionization device containing a media able to adsorb one or more organics (which may be charged or uncharged), thus removing at least some of the organics from the liquid to be purified. In some cases, the electrodeionization device may be able to remove organics from the liquid to be purified without the occurrence of substantial fouling within the electrodeionization device. As used herein, "substantial fouling" refers to conditions in which the formation of fouling deposits created by the organic material adversely affects the proper functioning and performance of the electrical purification apparatus. Examples of suitable media include, in addition to those described above, carbon particles, carbon filters, macroporous ion exchange resins, acrylic based resins, etc. In certain embodiments, an applied electric field may facilitate transport of a charged organic species from a diluting compartment into a concentrating compartment, e.g., across an ion-selective membrane, as previously described.

The media used within an electrodeionization device of certain embodiments of the invention, is regenerated by exposure of the media to a regeneration solution, for example an eluant solution containing at least one regenerant species, while within the device, for example, one or more of an acid solution (e.g., for regenerating cationic resins), a caustic solution (e.g., for regenerating anionic resins), or a concentrated salt solution (e.g., for regenerating cationic and/or anionic resins). For example, the media may be regenerated by exposing the media to a liquid, such as an eluant or a regeneration solution, of suitable composition and sufficient concentration to be able to desorb a substantial fraction of a target species adsorbed to the media. As used herein, a media is "substantially regenerated" when a "substantial fraction" of an adsorbed target species is removed. The "substantial fraction" of the adsorbed target species removed from the media, as used herein, refers to at least about 50% of a target species adsorbed on the resin being removed during regeneration, and in some cases, at least about 70%, or at least about 90% or more of a target species adsorbed on the resin is removed during regeneration. In some cases, substantially all of the target species adsorbed on the resin is removed during regeneration. In some cases, the polarity of the electrodeionization device may be reversed to facilitate regeneration of the media (e.g., as further described herein), and/or to reduce or eliminate scaling and/or fouling within the electrodeionization device. A controller may also be used, in some cases, to facilitate the regeneration of the media within the electrodeionization device, as more fully described below.

For many types of adsorption media and adsorbed species, e.g. certain ion exchange adsorption media and certain ionic target species, operating an electrodeionization device containing such media for the purpose of removing such species from a feed liquid, over time, results in the electrical resistivity of the media increasing as the media becomes more saturated with target species, e.g. such as divalent cations like $Ca^{2+}$ and $Mg^{2+}$. In some such embodiments, the adsorption media (which may be fully saturated or partially saturated with adsorbed species) may be regenerated to reduce its electrical resistivity. For example, adsorption media having a first electrical resistivity may be regenerated such that the electrical resistivity of the adsorption media after regeneration is less than the first electrical resistivity, for example, at least about 5% less, at least about 10% less, at least about 15% less, at least about 20% less, at least about 25% less, at least about 35% less, at least about 50% less, at least about 75% less, at least about 90% less, etc. than the first electrical resistivity.

By reducing the electrical resistivity of the adsorption media by regeneration, it may be possible to operate the electrodeionization device to obtain a desired degree of target species removal and product liquid purity with at a lower applied electrical potential than is typically achievable to obtain comparable performance for conventional electrodeionization devices. For example, in certain embodiments where an electrodeionization device of the invention comprises diluting and concentrating compartments separated from each other by cation selective membranes, the device may be operated with an applied electrical potential that can be maintained at a level sufficient to facilitate transport of a substantial amount of $Na^+$ from a dilute compartment to a concentrating compartment, while being insufficient to facilitate transport of a substantial amount of $Ca^{2+}$ from a dilute compartment to a concentrating compartment.

The eluant or regeneration solution may have a composition selected to facilitate desorption and/or exchange of target species such as ions, organics, etc. from the adsorption, media (i.e., "regenerating" the media). As used herein, an "acid" solution is given its ordinary meaning, e.g., a solution having a pH of less than 7. In some cases, the acid solution may be a strong acid solution, i.e., having a pH of less than about 3, less than about 2, or less than about 1. Examples of potentially suitable concentrations for acid solutions include about 4 wt %, about 5 wt %, about 7 wt %, or about 10 wt % of an acid in solution and examples of storage acids include $HNO_3$, $H_2SO_4$, HCl, etc. Similarly, as used herein, a "basic" or a "caustic" solution is given its ordinary meaning, e.g., a solution having a pH of greater than 7. In some cases, the caustic may be a strong caustic solution, i.e., having a pH of greater than about 12, greater than about 13, or greater than about 14. Examples of caustic solutions include about 4 wt %, about 5 wt %, about 7 wt %, or about 10 wt % of a base in solution and examples of strong bases include, NaOH or KOH.

A "concentrated salt solution," as used herein, is a solution containing a salt at a concentration at least sufficient to significantly regenerate the media after about 30 minutes, i.e., reducing the adsorbed species on the media by at least about 20%, and in some cases, by at least about 50%, by at least about 75% by at least about 80%, by at least about 85%, or by at least about 90% after about 30 minutes. Desorption from the adsorption and/or exchange of the adsorbed species with another species may occur in the presence of the eluant or regeneration solution, for instance, due to a change in the adsorption-desorption kinetics of the adsorbed species and the media, preferential binding of the media for a regenerant species such as a salt or ion in the regeneration solution, relative to the absorbed species at the prevailing conditions of concentration, etc. within the device (i.e., conditions causing exchange to occur), etc. In some cases, at least some of the desorption of the adsorbed species from the adsorption resin may occur through bringing about mechanical changes in the resin. For example, the resin may be exposed to a regeneration solution, such as an acid solution, a salt solution, or a caustic solution, where the solution is selected to cause shrinkage or swelling of the resin, which may mechanically dislodge certain entrapped and/or adsorbed species from the resin. For instance, exposure of a resin to a concentrated salt solution may shrink pores within the resin, which may thereby can cause organics adsorbed and/or contained within those pores to be dislodged.

Non-limiting examples of salts potentially suitable, depending on the media selected, to facilitate regeneration of adsorption media include salts containing one or more of $Na^+$, $K^+$, $Cl^-$, $F^-$, $Br^-$, $I^-$, etc. As one example, a species such as $Ca^{2+}$ or an organic, adsorbed on adsorption media, may be chemically and/or physically desorbed or ion exchanged with $Na^+$ or $K^+$ from a concentrated salt solution. In some cases, the concentrated salt solution used to regenerate the media may include alkali metal halides such as sodium chloride, potassium chloride, sodium fluoride, potassium fluoride, sodium bromide, potassium bromide, as well as mixtures thereof (e.g., a solution of sodium chloride and potassium chloride, etc.). In some cases, the concentration of salt may be at least about 4 wt %, at least about 5 wt %, at least about 7 wt %, at least 10 wt %, at least 12 wt %, at least about 15 wt %, or more in some cases.

Non-limiting examples of acids potentially suitable to facilitate regeneration of media include strong acids, such as mineral acids and mixtures comprising mineral acids, e.g., sulfuric acid, hydrochloric acid, nitric acid, or mixtures thereof. Similarly, non-limiting examples of bases potentially suitable to facilitate regeneration of media include strong bases and mixtures thereof, e.g., sodium hydroxide or potassium hydroxide.

In certain embodiments of the invention, the media may, advantageously, be regenerated within an electrodeionization device, for example, between purification cycles and/or during continuous or semi-continuous operation of the device. In some embodiments, the media is regenerated while the electrical purification apparatus continues to produce a purified product liquid, e.g., as further discussed below. The media may be regenerated at any time during use of the media, for example, when the media is fully spent (e.g., reaches equilibrium with respect to a target species) or when it is only partially saturated (e.g., the media has not reached equilibrium). The media is fully spent when the media is completely saturated with at least one adsorbed species such as a target organic species, a target ionic species, etc., i.e., the media is no longer able to adsorb, from solution, any more of the target organic species, target ionic species, etc. As used herein, the maximum amount of a particular species that a media is able to adsorb is referred to as the media's "maximum adsorption capacity" of that particular species. As used herein, "adsorption capacity" or "maximum adsorption capacity" refers to the maximum amount a particular species that the media is able to adsorb when exposed to the particular mixture of species to which the media happens to be exposed under a particular condition of use, which depends on the equilibria between all of the species in the particular solution to which the media is exposed. This is to be contrasted with the "nominal capacity" of the media for the particular species as would be measured under conditions where the media is exposed to a pure solution of the species (i.e. the species is the only agent in the solution having able to adsorb to the media). Thus, only for operating conditions wherein the media is exposed to a pure solution of a particular species will the "adsorption capacity" of the media for that species be the same as its "nominal adsorption capacity" for that species.

In certain embodiments, as mentioned above, the media may also be regenerated in some cases when the media is only partially spent (i.e., not yet fully spent). Thus, as a non-limiting example, the media may be regenerated when the ability of the media to adsorb a target species has begun to diminish, but where the media has not yet reached its maximum adsorption capacity for that particular target species (i.e., the media has not reached equilibrium). In some cases, the media may be regenerated when the media has absorbed at most about 10% of the media's maximum adsorption capacity for one or more target species, and in some cases, when the media has adsorbed at most about 20%, at most about 30%, at most about 50%, at most about 75%, at most about 80%, at most about 90%, at most about 95%, at most about 97%, at most about 98%, or at most about 99% of the maximum adsorption capacity of the media of one or more adsorbed species. In one embodiment, the media is regenerated at intervals such that equilibrium with the target species is never reached during extended use of the media.

In some embodiments, the media may be regenerated when the electrical resistivity of the media has reached a certain value (which, in some cases, may indicate that a certain amount of ionic species has been adsorbed onto the media, for example $Ca^{2+}$ or $Mg^{2+}$), and/or has changed by a certain amount. The electrical resistivity of the media may be determined, for example, using an electrical resistivity sensor. As a non-limiting example, the media may have a first electrical resistivity indicative of the media being substantially free of adsorbed species, and the media may be regenerated when the electrical resistivity of the media changes by at least a certain percentage from the first electrical resistivity, for example, the electrical resistivity may have changed by at least about 10%, at least about 25%, at least about 50%, at least about 75%, or at least about 100% of the first electrical resistivity.

In other embodiments, the media may be regenerated when the concentration of a species within an inlet and/or an outlet of the electrodeionization device (for example, within the dilute stream and/or the concentrate stream) has reached a certain concentration. For instance, the electrical purification apparatus may include one or more sensors able to detect sodium, calcium, etc., and such sensors may be positioned in fluidic communication with an inlet and/or an outlet of the electrodeionization device. In some cases, any of the above-described sensors (and/or other sensors within the electrical purification apparatus) may be in sensing communication with one or more monitors or controllers, which may be used, for example, to determine and/or control regeneration of the media, to control the concentration of one or more ions within the electrical purification apparatus (for example, within an inlet stream and/or an outlet stream of the electrodeionization device), or the like. For example, in response to a sensor measurement (e.g., a calcium ion concentration), the controller may initiate regeneration of the resin, add a fluid to an inlet or outlet stream of the electrodeionization device to maintain the concentration of a species below a certain value (for example, $Ca^{2+}$, $Mg^{2+}$, $Na^+$, etc.), or the like.

In some embodiments, the media may be regenerated within the device in such a way as to prevent substantial scaling and/or substantial fouling within the device, e.g., during desorption of target species absorbed on the media. For example, certain ion pairings such as $Ca^{2+}$ and $HCO_3^-$, $Mg^{2+}$ and $HCO_3^-$, certain ions and organics, etc. can cause scaling and/or fouling within an electrodeionization device. Thus, in one embodiment, the media may be treated, using certain regeneration solutions as described above, in a way as to substantially desorb a first species of, for example such an ion pair, from the media without substantially desorbing the second species of, for example such an ion pair, i.e., such that a substantial fraction of the first species desorbs from the media while the second species remains substantially adsorbed on the media. That is, the media may be treated such that the second species remains substantially adsorbed to the media while the first species is desorbed from the media, so that any amount of the second species that does desorb concurrently with the first species is generally at levels that are not able to cause substantial scaling and/or substantial fouling within the device, for instance upon precipitation or other interaction between the first and second species.

Optionally, in embodiments where the media is regenerated to prevent substantial scaling and/or fouling within the electrical purification device, as described above, the second species may then be desorbed from the media after the first species has been substantially desorbed and removed from the device, i.e., such that any of the first species that concurrently desorbs with the second species is insufficient to cause substantial scaling and/or fouling within the electrical purification device. For instance, the first species may be substantially desorbed from the media upon exposure of the media to a first regeneration solution that is able to desorb the first species but not a substantial amount of the second species from the media; then, the second species may be substantially desorbed from the media upon exposure of the media to a second regeneration solution. The first and second regeneration solutions may comprise the same or different solutes (e.g., salts, acids, caustic, etc.), and in some cases, the second solution may have a higher concentration or activity than the first solution. The media may be regenerated, in some cases, while the electrical purification apparatus is being used to produce a purified liquid.

As one particular example, in a device containing media to which bicarbonate ($HCO_3^-$) and calcium ($Ca^{2+}$) ions have been absorbed, the bicarbonate ions may first be desorbed from the media, followed by the desorption of calcium ions. The media may be any ion exchange media that has adsorbed bicarbonate and calcium ions, for example, cationic media, anionic media, combinations of these, etc. In some cases, the media may have a higher affinity to a specific ion that is desired to be desorbed, for example, calcium, magnesium, boron, iron, etc. As a particular example, bicarbonate ions may be desorbed from the media by exposing the media to a first salt solution containing dissolved NaCl at a concentration sufficient to cause desorption of bicarbonate to occur from the media, but insufficient to cause desorption of calcium to occur from the ion exchange media; for example, the salt solution may be a solution comprising NaCl at a concentration of below about 2 wt %, about 3 wt %, or about 4 wt % NaCl. The calcium ions, optionally, may later be desorbed from the media by exposure of the media to a second salt solution containing dissolved NaCl at a relatively higher concentration, which is sufficient to cause desorption of calcium to occur from the ion exchange media (a concentration typically higher than that of the first salt solution); for example, the concentration of the second salt solution may be at least about 4 wt %, at least about 5 wt %, at least about 7 wt %, at least about 9 wt %, or at least about 10 wt % or more of NaCl. As additional examples, the media may first be exposed to an acid solution, followed by a salt solution; a caustic solution, followed by an acid solution; a salt solution, followed by an acid solution; a salt solution, followed by a caustic solution.

The resin may be regenerated within the electrodeionization device by any suitable technique. In one set of embodiments, the resin may be regenerated within the electrodeionization device by exposing the resin to a regeneration solution, e.g., as previously described. For example, the electrodeionization device may be operated in a batch or a semi-batch mode, where all or a portion of the resin is periodically exposed to a regeneration solution. In some cases as further described below, for example, during semi-batch operation, other portions of the electrodeionization device (for example, other compartments) may still be used to produce a purified liquid while the media is being regenerated. Depending on the mode of operation and the particular application, the resins in the dilute, concentrating, or both compartments may be regenerated, for example, sequentially or simultaneously.

In some cases, the media may be regenerated using a combination of techniques. For example, the media may be regenerated using one or more regeneration solutions, for example, an acid solution, a caustic solution, a concentrated salt solution, etc., optionally in combination with techniques and/or agents able to cause the media to shrink or swell. Causing shrinkage or swelling of the media may dislodge or otherwise desorb ions, organics, etc. from the media, e.g., by physical forces or mechanical disruption, etc. For instance, in one embodiment, ions, organics, etc. may be desorbed from pores that may be present within the media.

Figure 2A:
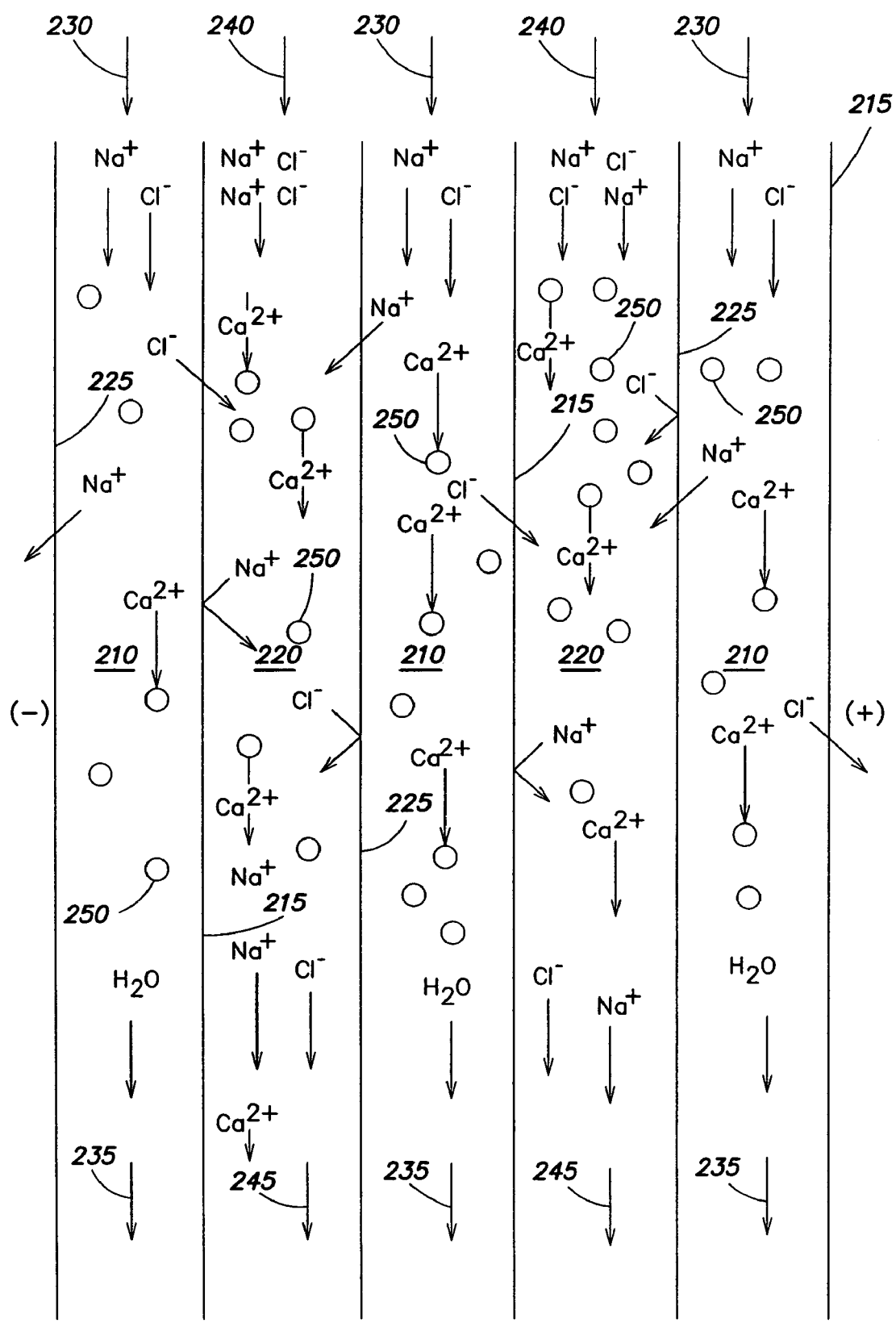
FIGS. 2A and 2B are schematic diagrams illustrating ion movement within an electrodeionization device.
Figure 2B:
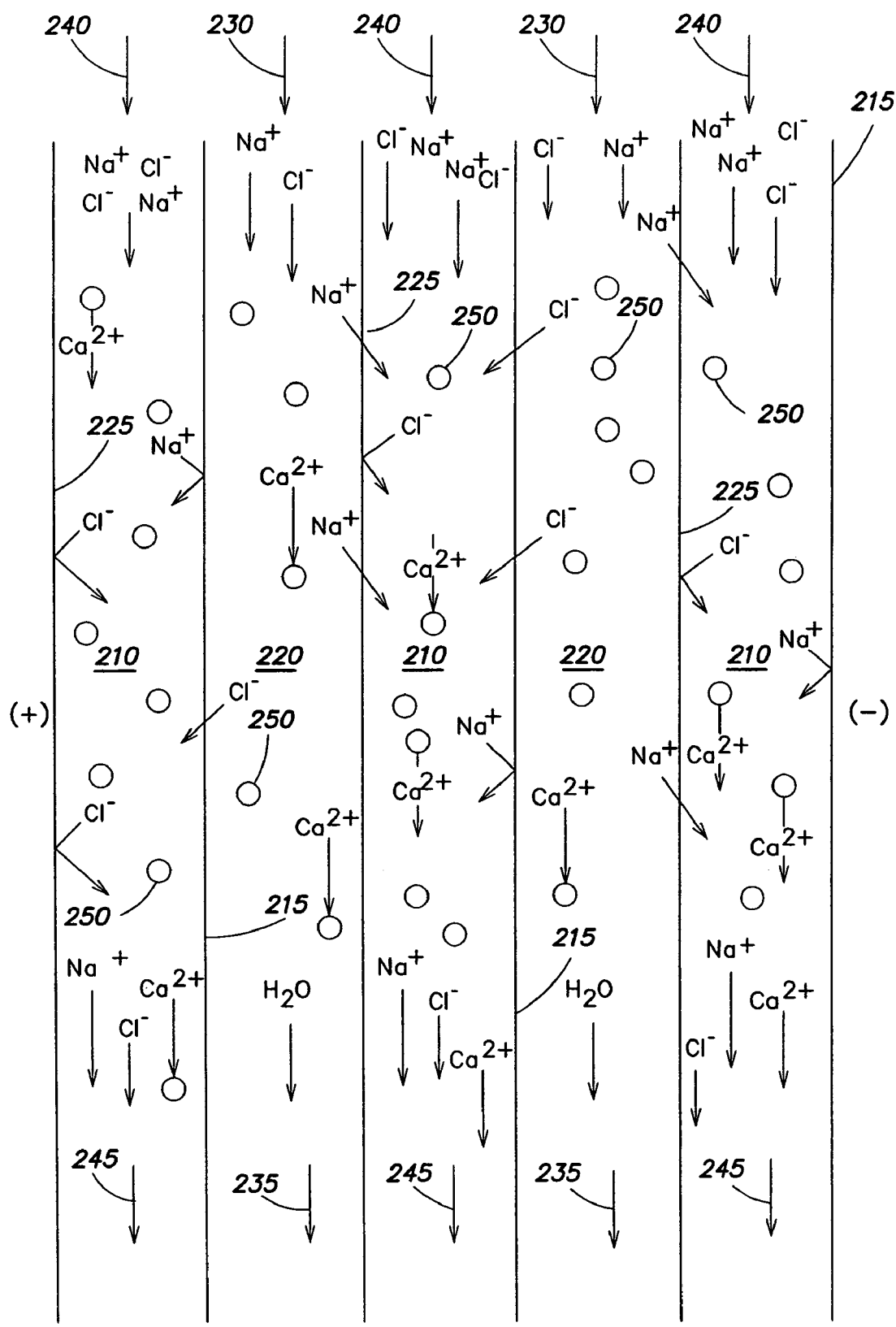

In one set of embodiments, media may be regenerated within an electrodeionization device of an electrical purification apparatus while the apparatus is used to produce a purified liquid. An example of the regeneration of media within an electrodeionization device simultaneously with liquid purification is illustrated in FIGS. 2A and 2B, in the context of an electrodeionization device where the electric field can be reversed (e.g., as further discussed below). Referring to FIG. 2A, the polarity or direction of the electrical field initially is such that negatively charged ions (e.g., $Cl^-$, $HCO_3^-$, $CO_3^{2-}$, etc.) are attracted to the right (+), while positively charged ions (e.g., $Ca^{2+}$, $Na^+$, $K^+$) are attracted to the left (−). In this figure, anion-selective membranes 215 preferentially allow transport of negatively charged ions therethrough, while cation-selective membranes 225 preferentially allow transport of positively charged ions therethrough.

A liquid to be purified 230, containing one or more target species to be removed (e.g., ions, organics, etc.), is passed through compartments 210, while a concentrated salt solution used for regeneration 240 is passed through compartments 220. As previously described, when the liquid to be purified enters diluting compartments 210, the target species to be removed can adsorb onto media 250. Concentrated salt solution 240 flows through concentrating compartments 220 in FIG. 2A. Species that have been adsorbed onto media 250 can be desorbed upon exposure of the media to the concentrated salt solution 240 (entering into liquid 245 to exit the compartment), as previously described. Thus, liquid 235 exiting diluting compartment 210 has been purified (i.e., such that the liquid has a lower concentration of species to be removed than entering liquid 230), while liquid 245 exiting concentrating compartments 220 has regenerated at least a portion of media 250. Liquid 245 can then enter other processes or operations, be disposed of as waste, etc.

In some cases, the direction of the electric field may be reversed during operation of the device (see also U.S. Pat. No. 5,558,753) resulting, for example, in the arrangement illustrated in FIG. 2A being converted into the arrangement illustrated in FIG. 2B. In this arrangement, the (at least partially) regenerated media 250 in compartments 220 can now be used for liquid purification, while the media 250 in compartments 210, which was at least partially saturated, e.g., with one or more adsorbed target species, may be regenerated. By reversing the direction of the electric field within the electrodeionization device, compartments 210 now act as concentrating compartments, while compartments 220 now act as diluting compartments. Additionally, the inlets for entering liquids 230 and 240 can be reversed, such that the liquid to be purified 230 enters compartments 210 (now diluting compartments), while concentrated salt solution 240 enters compartments 220 (now concentrating compartments). The same transport principles described above with respect to FIG. 2A also apply for the configuration shown in FIG. 2B, reversed due to the reversal of the electric field; thus, compartments 210 now produce a purified liquid, while compartments 220 now produce a liquid that contains at least a portion of the target species removed from liquid 230 and/or desorbed from media 250. Additionally, media 250 in compartments 210 can now be regenerated upon exposure to concentrated salt solution 240, while (previously regenerated) media 250 in compartments 220 can now be used to adsorb one or more target species from the liquid to be purified 230.

The electric field of the electrodeionization device may be reversed in such cases (e.g., between the embodiments shown in FIGS. 2A and 2B) as often as necessary or desired for a particular application. The frequency of cycling between the two polarities of the electric field may be altered depending on factors specific for a particular application, such as the hardness or target species concentration of the feed water; the concentration and/or composition of the concentrated salt solution used for elution; the type, quantity, and/or size of the media; the flowrates of the incoming liquids; the size of the electrical purification apparatus and the compartments therein; the applied voltage; the desired degree of purification; measurements of scale formation and/or degree of fouling; or the like. Those of ordinary skill in the art will be able to select or optimize the operating conditions of a particular electrical purification apparatus to suit a particular application, using no more than routine experimentation. For example, the electric field may be reversed when a certain concentration of a target species such as a hardness ion or organic species, a compound indicative of fouling and/or scale formation, or the like is detected in an exiting liquid concentrate and/or product stream. As another example, the electric field may be reversed when a certain amount or concentration of a target species is able to pass through the electrical purification apparatus without being adsorbed, for instance, when a certain amount of a target species is detected in one or more streams exiting the electrical purification apparatus, such as when breakthrough of a target species from the media within the electrical purification apparatus has been reached. In yet another example, the electric field may be reversed when a certain threshold liquid purity is not met (e.g., a concentration of a target species within the purified liquid stream exceeds a certain predetermined value or range). In still another example, the electric field may be reversed at a fixed rate or frequency, e.g., every 6 hours or every 24 hours, or when the electrical purification has been operated for a predetermined length of time, for example, after 12 hours of use, after 36 hours of use, after a week of use, etc. In yet another example, the electric field may be reversed in response to a concentration measurement (for example of a hardness ion or other target species) within a concentrating and/or within a diluting compartment of the electrodeionization device, for example, by a sensor, such as a conductivity sensor, a calcium sensor, a sodium sensor, or the like. In another example, the electric field may be reversed when substantial scaling and/or fouling begins to occur, for example, within the electrodeionization device (e.g., on an ion-selective membrane), within the electrical purification apparatus, etc. The reversal of the electric field may occur simultaneously with regeneration of the resin within the electrodeionization device, or the reversal may occur before or after regeneration of the media within the electrodeionization device, depending on the particular application.

By reversing the electric field periodically within the electrodeionization device, the electrical purification apparatus may be operated essentially continuously for extended periods of time, according to one set of embodiments. The media in one compartment (the concentrating compartment) can be regenerated while the media in the other compartment (the diluting compartment) is in use; then, upon reversal of the electric field, the regenerated media can be used while the used media can be regenerated. This process can be repeated as many times as desired, thus providing essentially continuous use of the electrical purification apparatus to produce a purified liquid. By "essentially continuous," it is meant that the electrical purification apparatus can be used to produce a purified liquid upon demand (e.g., intermittently, periodically, continuously, etc.), with only a brief interruption when the direction of the electric field is reversed and the purified stream of liquid from the apparatus is allowed to stabilize, i.e., the electrical purification apparatus does not have a period of time in which media is removed from the apparatus or recharged, during which time the electrical purification apparatus cannot be called on to produce a purified stream of liquid. In some cases, during the initial period after voltage reversal where deterioration of water quality occurs in the newly formed concentrating stream, the deterioration of water quality is sufficiently minor that the liquid product need not necessarily be discarded at any time during or between voltage reversal. In other words, the conductivity of the liquid product from either or both of the newly formed depleting or concentrating compartments are sufficiently low as to render the liquid product acceptable in one stream or the other stream or both. Thus, in many cases, the brief interruption may be only minutes or seconds long, or even non-existent (i.e., the electrical purification apparatus can be used to produce a purified stream of liquid upon demand at any time, without any interruption in liquid production). See, for example, U.S. Pat. No. 4,956,071.

In one set of embodiments, the electrical purification apparatus may be operated for arbitrary, selected, or predetermined periods of time. In another set of embodiments, the electrical purification apparatus may be operated to allow for the removal from feed liquid, e.g., by adsorption to media, of a greater amount of one or more target species than the maximum loading capacity of the media to the target species. That is, the media can be used in such embodiments to remove one or more target species from a liquid to be purified, where the amount of the target species that can be removed by the media is greater than the amount of the target species that the media can adsorb at any one time, i.e., when the media is saturated (the "maximum loading capacity"). This is enabled by the inventive technique of periodically "recharging" the capacity of the media, while it remains in the electrodeionization device, via the above-described regeneration techniques. This can allow for improvement in operation over conventionally operated devices by reducing the tendency to form scale and/or organic fouling and/or by maintaining the species-selective adsorption characteristics of the media over a much more extended period of operation of the electrodeionization device.

Advantageously, in certain embodiments, the methods of operation and regeneration according to certain aspects of the invention can enable an electrodeionization device within an electrical purification apparatus to be exposed directly to and process for purification a "hard" or "dirty" water without an upstream "softening" or purification process, i.e., a process able to remove or reduce in concentration hardness ions or other undesirable species, such as TOC or specific organic species, from solution. Examples of water softening devices that typically must be provided upstream of conventional electrodeionization devices, which can be avoided in certain embodiments of the present invention, include ion exchange devices, reverse osmosis devices, ultrafiltration devices, nanofiltration devices, dialysis devices, and the like. Thus, in one set of embodiments, hard water and/or water containing relatively high levels of TOC may directly enter an electrodeionization device, without upstream softening or pretreatment to remove TOC. In another set of embodiments, some softening of the incoming water (or other liquid) may occur, but not enough to fully "soften" the water entering the electrodeionization device (i.e., to concentrations of hardness ions or other target species that are low enough to prevent substantial scaling and/or substantial fouling from occurring in conventionally operated electrodeionization devices). In yet another set of embodiments, the electrical purification apparatus is able to remove a certain amount of a target species such as a hardness ion from the inlet liquid (for example, from hard water, as previously described). For example, greater than about 70%, about 80%, about 90%, about 95%, about 97%, about 98%, or about 99% of the entering hard ions or other target species may be removed by the electrical purification apparatus, and in some cases, without resulting in substantial scaling within the electrical purification apparatus. Thus, in one set of embodiments, the electrical purification apparatus is able to treat hard water without substantial scaling or fouling within the electrical purification apparatus.

Figure 3:
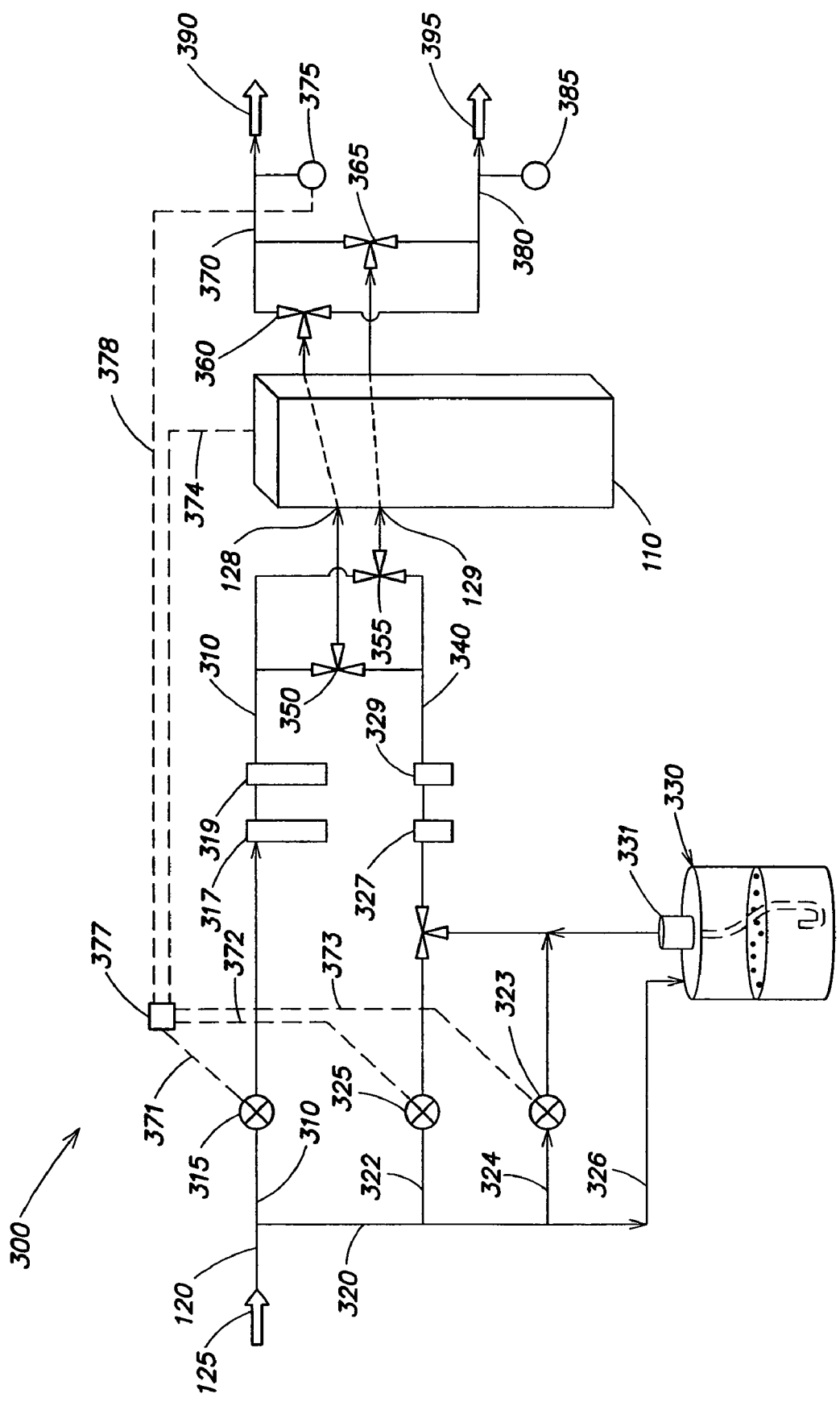
FIG. 3 is a schematic diagram illustrating an example of an electrical purification apparatus, in accordance with one embodiment of the invention.

An example of an electrical purification apparatus according to certain embodiments of the invention that can be used essentially continuously while providing regeneration of media is shown in FIG. 3. In the illustrated embodiment, electrical purification apparatus 300 includes a single point of entry 125 for a liquid to be purified. Of course, in other embodiments, the electrical purification apparatus may contain more than one point of entry, for example, two points of entry for one or more liquids to be purified, a first point of entry for a liquid to be purified and a second point of entry for a concentrated salt solution, etc. Liquid 120, in the example shown in FIG. 3, upon entering system 300, is divided into a dilution pathway 310 and a concentrating pathway 320. Dilution pathway 310 passes through several liquid control systems 315, 317, 319, etc. which may be, for example, valves, filters, flow meters, additional piping, flow control elements, sensors, actuators, viscometers, thermometers, thermocouples, pH sensors, constriction elements, or the like. In some cases, the liquid control systems may include devices for introducing additives into the liquid stream, for example, to control pH or microorganisms, to facilitate flocculation, etc. Those of ordinary skill in the art will be able to identify suitable devices and systems to achieve a particular purpose for a given application; as one particular example, liquid control system 315 can be a flow control element, such as a valve, and liquid control systems 317, 319 may be filters. In concentrating pathway 320 in FIG. 3, the liquid control system has been expanded as an illustrative example. Here, concentrating pathway 320 is divided into branches 322, 324, 326. Branch 326 enters reservoir 330 in this non-limiting example, while braches 322, 324 represent various bypass and control systems around reservoir 330 (for instance, in systems where reservoir 330 is not necessary for routine operation of system 300 and is used as a surge tank or an overflow tank). Also shown in FIG. 3 are several additional liquid control systems 323, 325, 327, 329; for instance, liquid control systems 327, 329 may be filters, and liquid control systems 323, 325 may be flow control elements, such as valves.

Reservoir 330, in one embodiment, may be a holding tank or other vessel able to store liquids, for example, a surge tank, an overflow tank, etc. In another embodiment, reservoir 330 may be filled with any suitable fluid for use in the electrical purification apparatus, depending on the particular application. For instance, reservoir 330 may contain a solution having a composition selected to facilitate regeneration of media contained within electrodeionization device 110, such as a concentrated salt or acid solution. Reservoir 330 may be filled and emptied using any suitable technique known to those of ordinary skill in the art. For example, if reservoir 330 is to be filled with a concentrated salt solution, the concentrated salt solution may be introduced into reservoir 330 from an external source (not shown in FIG. 3), reservoir 330 may be filled using branch 326, optionally passing the liquid through an element that adds salt to increase salt concentration, etc. As another example, pump 331 may be used to pump a liquid into and/or out of reservoir 330.

In the example system of FIG. 3, branches 322, 324, 326 (via reservoir 330) are combined into a concentrating pathway 340. Diluting pathway 310 and concentrating pathway 340 are introduced into electrodeionization device 110 through inlets 128, 129, respectively. In embodiments where the polarity of electrodeionization device 110 is periodically reversed (for example, when a certain condition is reached, e.g., when a certain minimum and/or maximum concentration of a target species is detected in a liquid exiting the device), 3-way valves 350, 355 can be used to direct the flow of liquid from concentrating pathway 340 and liquid from diluting pathway 310 into appropriate compartments of the electrodeionization device 110, as discussed above. Similarly, 3-way valves 360, 365 can be used to direct exiting liquids from the concentrating and diluting compartments within the electrodeionization device 110 into appropriate pathways, e.g., product pathway 370 and disposal pathway 380. Optionally, liquid control systems 375, 385 may be present on the product and/or disposal pathways, for example, to monitor flowrates or concentrations of one or more target species. Liquids from pathways 370, 375 then exits electrical purification apparatus 300 through point of uses 390, 395.

In FIG. 3, liquid control system 375 is in electronic communication with monitor/controller 377 through signal line 378. The signal may be any suitable signal, for example, a pneumatic signal, an electrical signal, a mechanical signal, or the like. Monitor/controller 377 may be any system or mechanism that can detect the incoming signal from signal line 378, determine an appropriate response, and transmit a signal through signal lines 371, 372, 373, 374 to liquid control systems 315, 317, 319 and/or electrodeionization device 110. Signal lines 371, 372, 373, 374, and 378 do not each necessarily have to transmit the same type signal. Monitor/controller 377 may be, for example, a mechanical controller, a pneumatic controller, a computer or series of computers, a semiconductor chip or other integrated circuit microprocessor, or the like. In some embodiments, monitor 377 may be a "hard-wired" control system, a preprogrammed computer control system, or the monitor 377 may be a computer-implemented control system that is programmable and adaptable as needed. The algorithm may be a predetermined algorithm, or it may be an algorithm that may adapt with changing process conditions, such as in a process where the flow is pulsatile or randomly distributed. As a specific example, when monitor/controller 377, based on sensor readings from liquid control system 375 (and/or other liquid control systems, not shown) determines that regeneration of media within electrodeionization device 110 is indicated (for example, when the concentration of a hardness ion in point of use 390 has reached a certain level; when a certain degree of saturation of adsorption media with a target species in a diluting compartment of the device is detected, e.g. at least 50% saturation, 75% saturation, 90% saturation, or greater; when a certain threshold concentration of a target species is detected in the liquid in a concentrating compartment of the device, e.g. any non-zero concentration indicative of breakthrough; when a change of electrical resistivity of the adsorption media and/or power consumption of the device and/or applied electrical potential required, which are indicative of a certain level of saturation of the adsorption with target species, is detected; etc.), monitor 377 may then initiate an appropriate response (for example, by effecting or causing to be effected one or more of: introducing a regeneration solution into electrodeionization device 110, reserving polarity within electrodeionization device 110, signaling to a human operator that a certain concentration or other condition has been reached, etc.).

Figure 4:
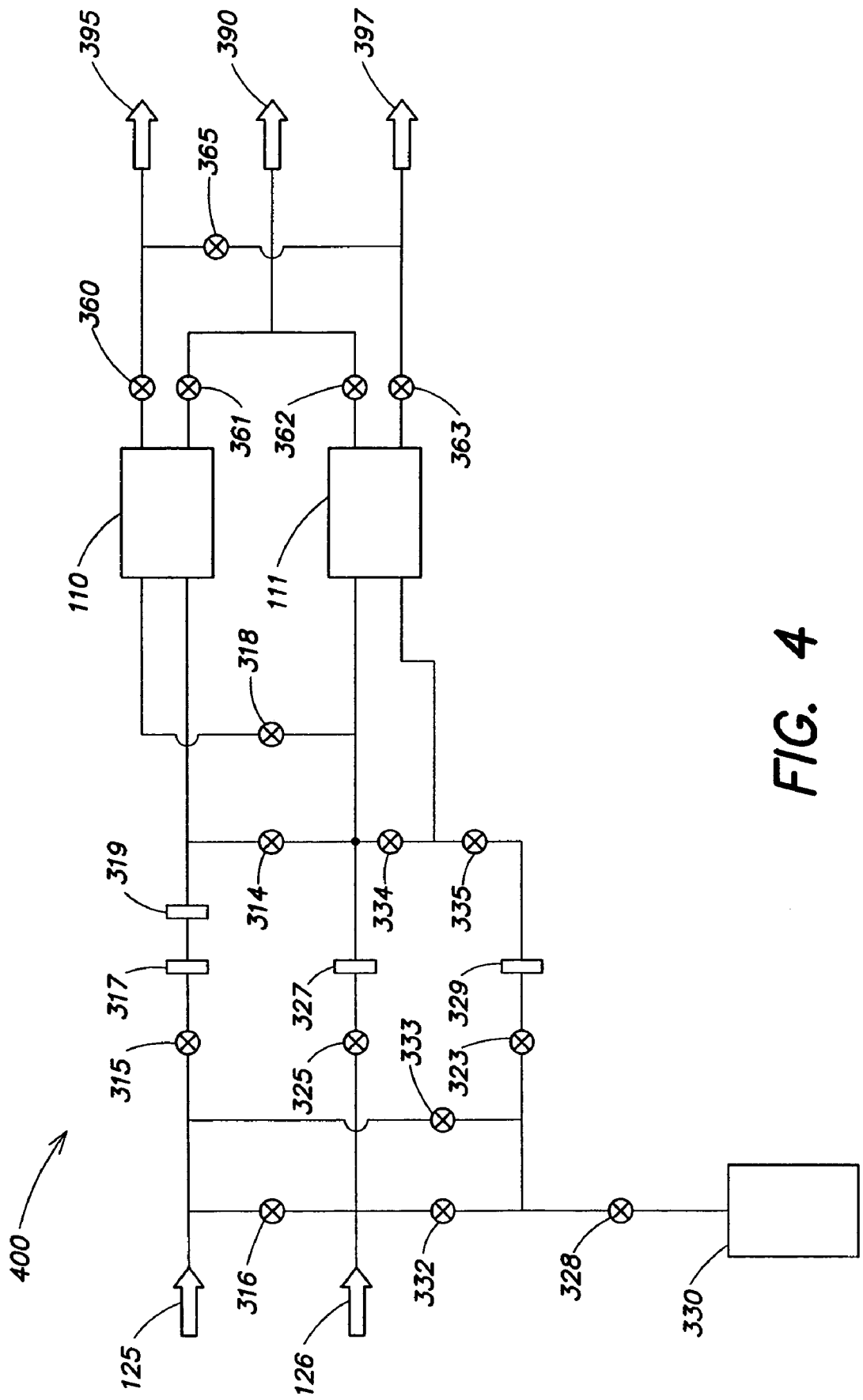
FIG. 4 is a schematic diagram illustrating an example of an electrical purification apparatus, in accordance with another embodiment of the invention.

In FIG. 4, another example of an electrical purification apparatus 400 able to be used essentially continuously is shown. For clarity, the monitor/controller and control system discussed above is not specifically illustrated; although, in certain embodiments, such a control system would be provided. In this example, electrical purification 400 has two electrodeionization devices 110, 111 in parallel. Liquid(s) enters electrical purification apparatus 400 from points of entry 125, 126. The liquids entering points of entry 125, 126 can be the same or different. A series of liquid control systems 314, 315, 316, 317, 318, 319, 323, 325, 327, 328, 329, 332, 333, 334, 335 directs the liquid(s) to electrodeionization devices 110, 111. The liquid control systems may include filters, flow meters, additional piping, flow control elements, sensors, actuators, viscometers, thermometers, thermocouples, pH sensors, constriction elements, or the like, as previously described with reference to FIG. 3. For instance, liquid control systems 314, 315, 316, 318, 323, 325, 328, 332, 333, 334, 335 may represent pumps or valves, while liquid control systems 317, 319, 327, and 329 may represent filters or sensors. As described in the context of FIG. 3 above, the system may be controlled by one or more monitors/controllers (not shown), which may in communication with one or more sensors (not shown). Optionally, liquid may also be directed to or from reservoir 330. Upon exiting electrodeionization devices 110, 111, liquid is directed by liquid control components, such as valves 360, 361, 362, 363, 365 to points of use 390, 395, 397. In some cases, one electrodeionization device may be used to purify liquid, while the other electrodeionization device is not used for liquid purification purposes; as examples, maintenance may be performed on the other electrodeionization device, the other electrodeionization device may be used to regenerate media, etc. In some cases, the roles of the electrodeionization devices operating in parallel may be reversed (or both activated simultaneously) to ensure essentially continuous operation of the electrical purification apparatus.

Figure 11:
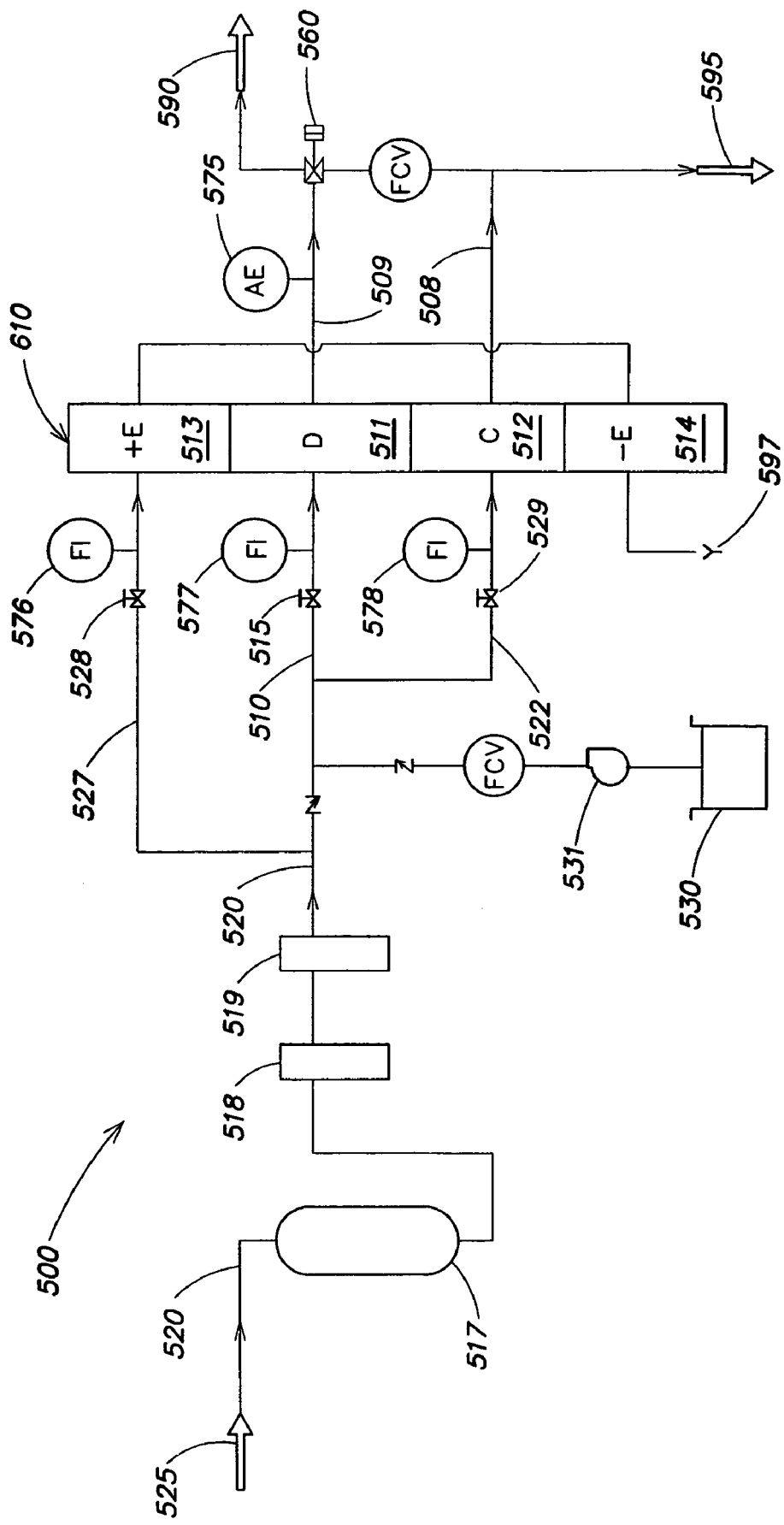
FIG. 11 is a schematic diagram illustrating an example of an electrical purification apparatus, in accordance with one embodiment of the invention.

Another example of an electrical purification apparatus is shown in FIG. 11. In this figure, liquid enters electrical purification apparatus 500 from the point of entry 525 into stream 520. The liquid is then optionally passed through one or more filters before reaching electrodeionization device 610. For example, as shown in FIG. 11, the liquid may be passed through one or more of a softener 517, a carbon filter 518, and/or a particle filter 519. Of course, in other embodiments other filters (or no filters) can be used, depending on the particular application. After passing through filters 517, 518, and 519, in FIG. 11, the liquid is divided into three streams 510, 522, and 527. The flow rates in each of these streams may be controlled through the use of diaphragm valves 515, 529, and 528, respectively. Stream 527 is directed at the electrode compartments of electrodeionization device 610. Stream 527 passes through anode compartment 513 of electrodeionization device 610, then through cathode compartment 514, before being directed to drain 597. Stream 510 is passed through diluting compartment 511 of electrodeionization device 610, exiting as stream 509, while stream 522 is directed to concentrating compartment 512 of electrodeionization device 610, exiting as stream 508. It should be noted, that although electrodeionization device 610 is depicted in FIG. 11 as having a single diluting compartment 511 and a single diluting compartment 512, electrodeionization devices having multiple diluting and/or concentrating compartments are also contemplated in other embodiments of the invention, and the single diluting and concentrating compartments of electrodeionization device 610, as depicted in FIG. 11, are for clarity only. For example, in other embodiments, the electrodeionization device may have a configuration similar to that shown in FIG. 1.

In FIG. 11, after exiting electrodeionization device 610, stream 508 is directed to a reject 595, while stream 509 exiting diluting compartment 511 is directed to three-way valve 560. Valve 560 can be directed to send the liquid within stream 509 to a point of use 590, or to reject 595. When electrical purification apparatus 500 is used to produce a purified fluid, three-way valve 560 can be directed to point of use 590. However, during regeneration of the media contained within the electrodeionization device 610, three-way valve 560 can be directed to reject 595.

As shown in FIG. 11, reservoir 530 may contain a solution having a composition selected to facilitate regeneration of the media contained within electrodeionization device 610, such as a concentrated salt or acid solution. Reservoir 530 may be filled and emptied using any suitable technique known to those of ordinary skill in the art. During regeneration, pump 531 may direct the regenerant solution into one or both diluting compartment 511 and concentrating compartment 512.

Upon exiting these compartments, the regenerant solution can be directed to reject 595, as previously described.

Sensor 575 is in fluidic communication with stream 509 exiting diluting compartment 511. Sensor 575 may be, for example, a conductivity sensor, a calcium sensor, a sodium sensor, or the like. A monitor or a controller (not shown) may monitor the signal that is produced by sensor 575, and in some cases, may determine an appropriate response, for example, signaling when regeneration of the media contained within electrodeionization device 610 is required. Other sensors may also be present, for example, flowrate sensors, temperature probes, pressure meters, or the like. As an example, in FIG. 11, sensors 576, 577, and 578 may detect a characteristic of streams 527, 510, and 522, respectively, for example, flowrate.

Figure 12:
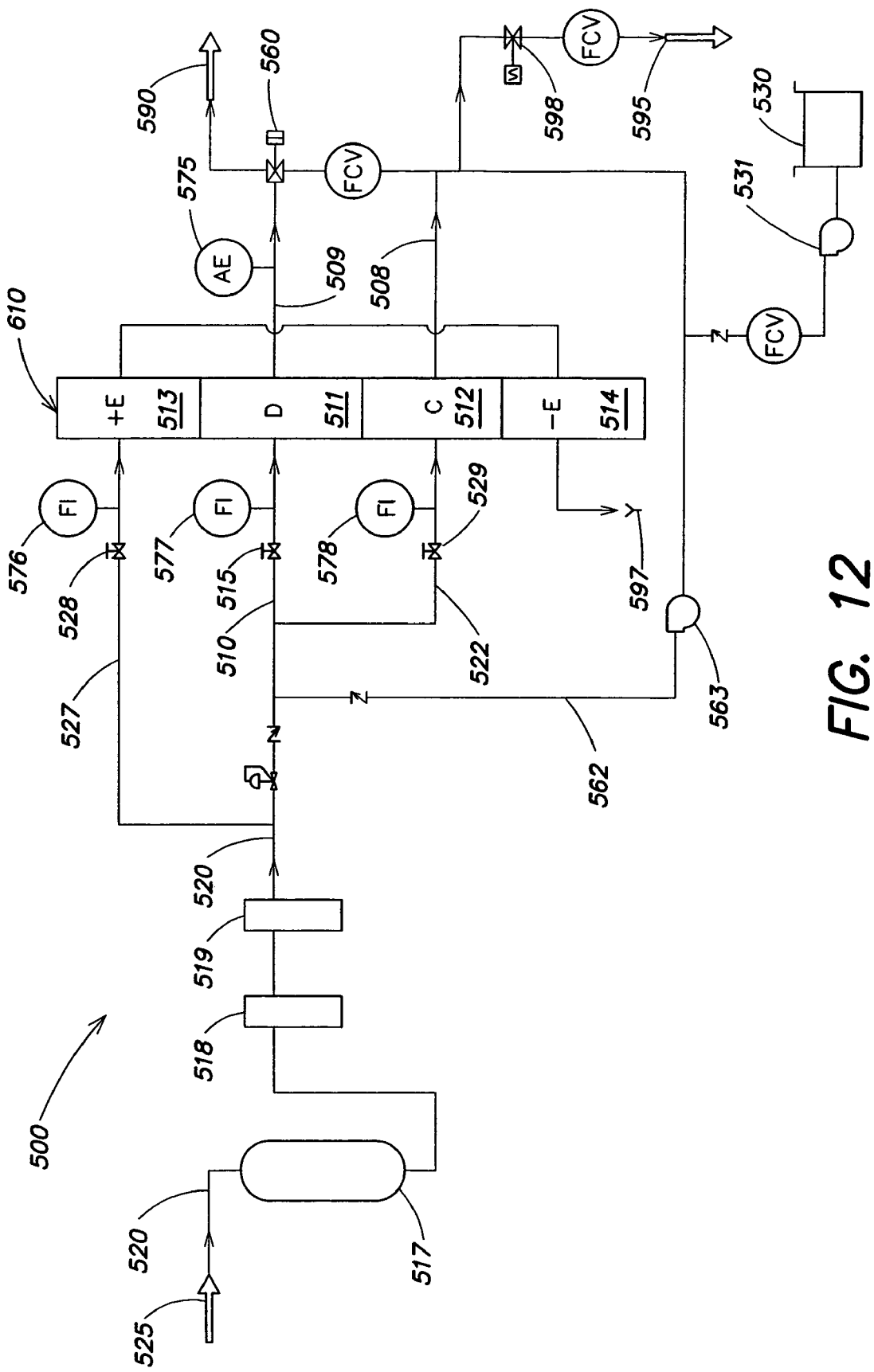
FIG. 12 is a schematic diagram illustrating an example of an electrical purification apparatus, in accordance with another embodiment of the invention.

Another example of an electrical purification apparatus of the invention is illustrated in FIG. 12. This apparatus is configured similarly to the electrical purification apparatus illustrated in FIG. 11, although stream 508, upon exiting concentrating compartment 512 of electrodeionization device 610, is directed to a recycle loop 562, controlled by pump 563. Recycle loop 562 can be directed to reject 595 (controlled using valve 598), and/or to streams 510 and/or 522 entering diluting compartment 511 and concentrating compartment 512, respectively. In the embodiment shown in FIG. 12, the regenerant solution contained within reservoir 530 can be injected into electrodeionization device 610 until the electrodeionization device is essentially filled with the regenerant solution, and/or recirculated within recycle loop 562 in conjunction with electrodeionization device 610, as necessary, for example, until the media contained within electrodeionization device 610 has been sufficiently regenerated. Upon a suitable level of regeneration, the regenerant liquid can then be directed to reject 595. This arrangement can improve flow distribution within the electrodeionization device, and in some cases, this arrangement may help to reduce the amount of regenerant solution necessary to regenerate the adsorption media contained within electrodeionization device 610.

Figure 13:
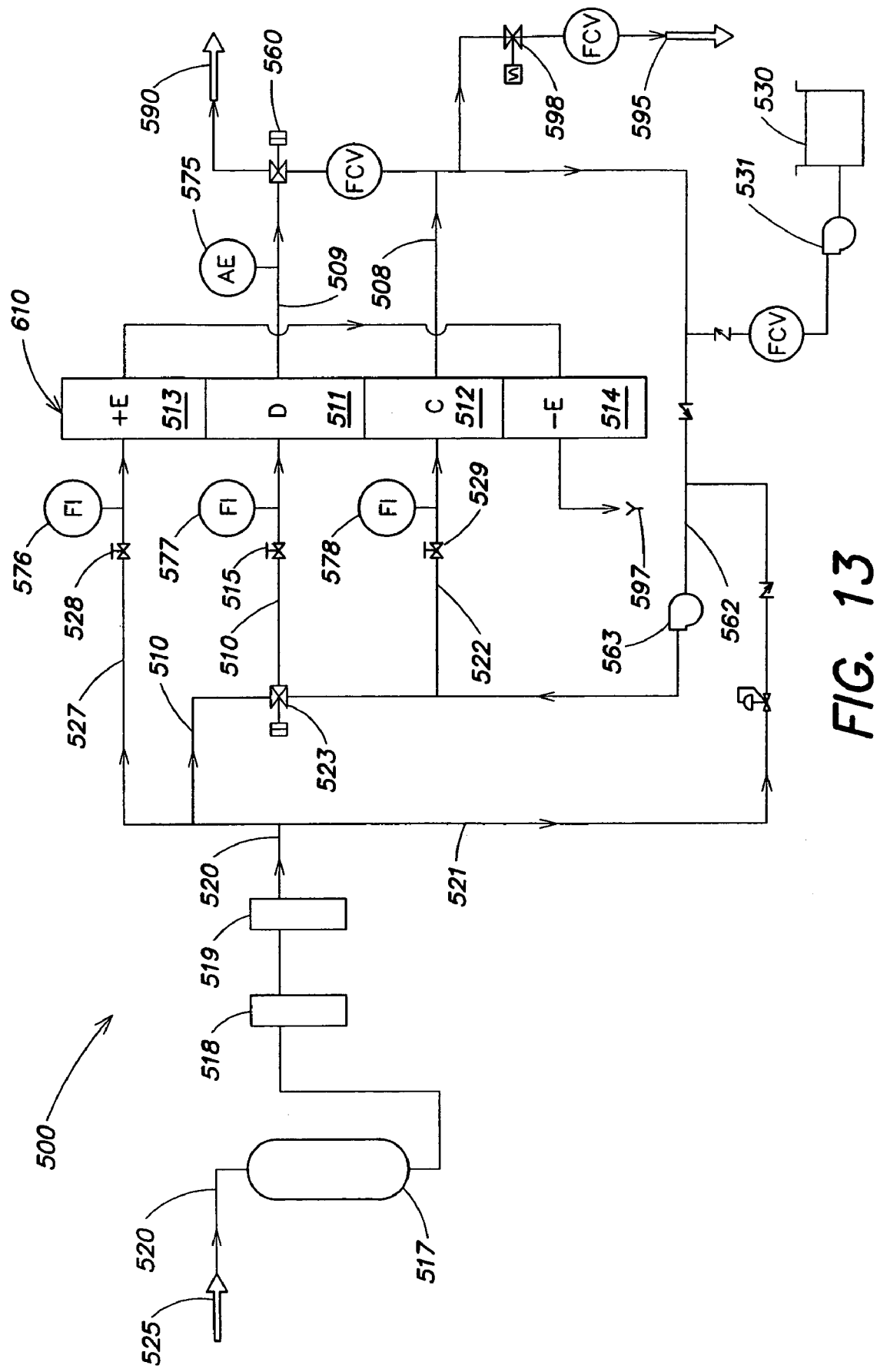
FIG. 13 is a schematic diagram illustrating an example of an electrical purification apparatus, in accordance with yet another embodiment of the invention.

The example illustrated in FIG. 13 is similar to the electrical purification apparatus illustrated in FIG. 12. In this figure, stream 520 is divided into three streams 510, 527, and 521. Stream 527 is directed towards the electrodes of electrodeionization device 610, while stream 510 is directed toward diluting compartment 511 of the electrodeionization device. Stream 521 is directed through a portion of recycle loop 562 to concentrating compartment 512 in electrodeionization device 610. Three-way valve 523 can be used to prevent mixing of streams 510 and 522. Also in this arrangement, pump 563 can be used while electrodeionization device 610 is used to produce a purified fluid, as well as during regeneration of the media contained within the electrodeionization device 610. By allowing a portion of the concentrate stream to be regenerated via stream 562, the flow velocities of the fluids within the concentrating and diluting compartments of electrodeionization device 610 may be controlled to be approximately equal (thus lessening the affect of pressure differences across any membranes contained within electrodeionization device 610), or at any other desired relative flow velocity. In addition, in some cases, substantially higher water recoveries may be achievable using such an electrical purification apparatus.

Figure 14:
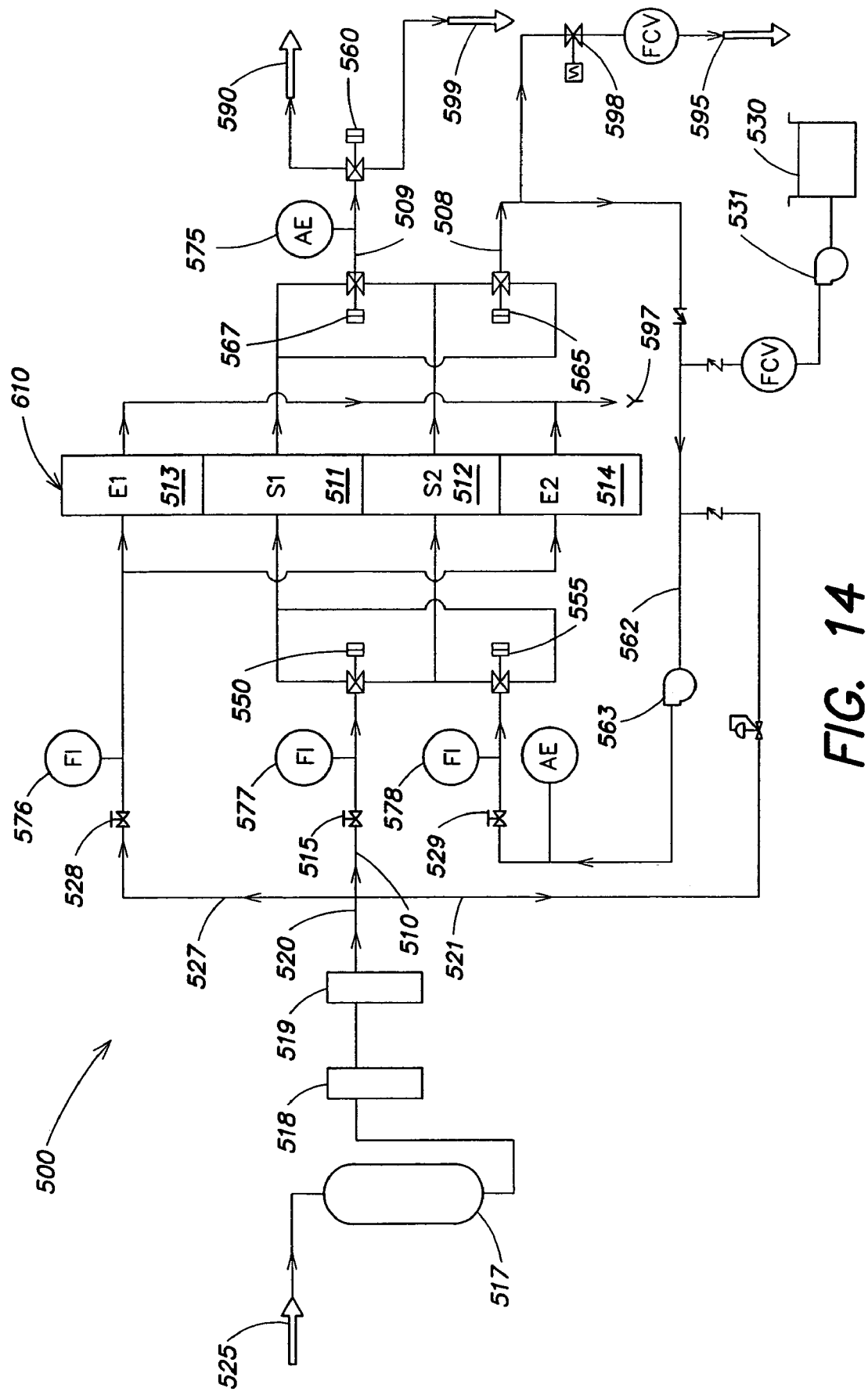
FIG. 14 is a schematic diagram illustrating an example of an electrical purification apparatus, in accordance with still another embodiment of the invention.

The electrical purification apparatus in FIG. 14 can also be operated in such a manner as to simultaneously produce a purified liquid and regenerate resin contained within electrodeionization device 610, as previously described. In FIG. 14, the electrical purification apparatus illustrated in FIG. 13 has been modified to allow for polarity reversal of electrodeionization device 610. In this figure, stream 527, instead of serially passing through anode compartment 513 and cathode compartment 514, is passed in parallel through both electrode compartments (it should be noted that such a configuration can be used in other electrical purification apparatuses as well, for example, the apparatuses shown in FIG. 12 or 13). Additionally, in FIG. 14, through the use of additional valves 550, 555, 565, and 567, liquids can be directed to the appropriate compartments within electrodeionization device 610 to allow for polarity reversal of electrodeionization device during use of the device. Also in FIG. 14, three-way valve 560 can direct a purified liquid to either a point of use 590, and/or to a reject 599, for example, when the purified liquid is not of an acceptable purity to be directed to the point of use. For example, immediately upon reversal of electrical polarity within electrodeionization device 610, the liquid within stream 509 may not be of acceptable purity, and thus is directed to reject 599.

Figure 15:
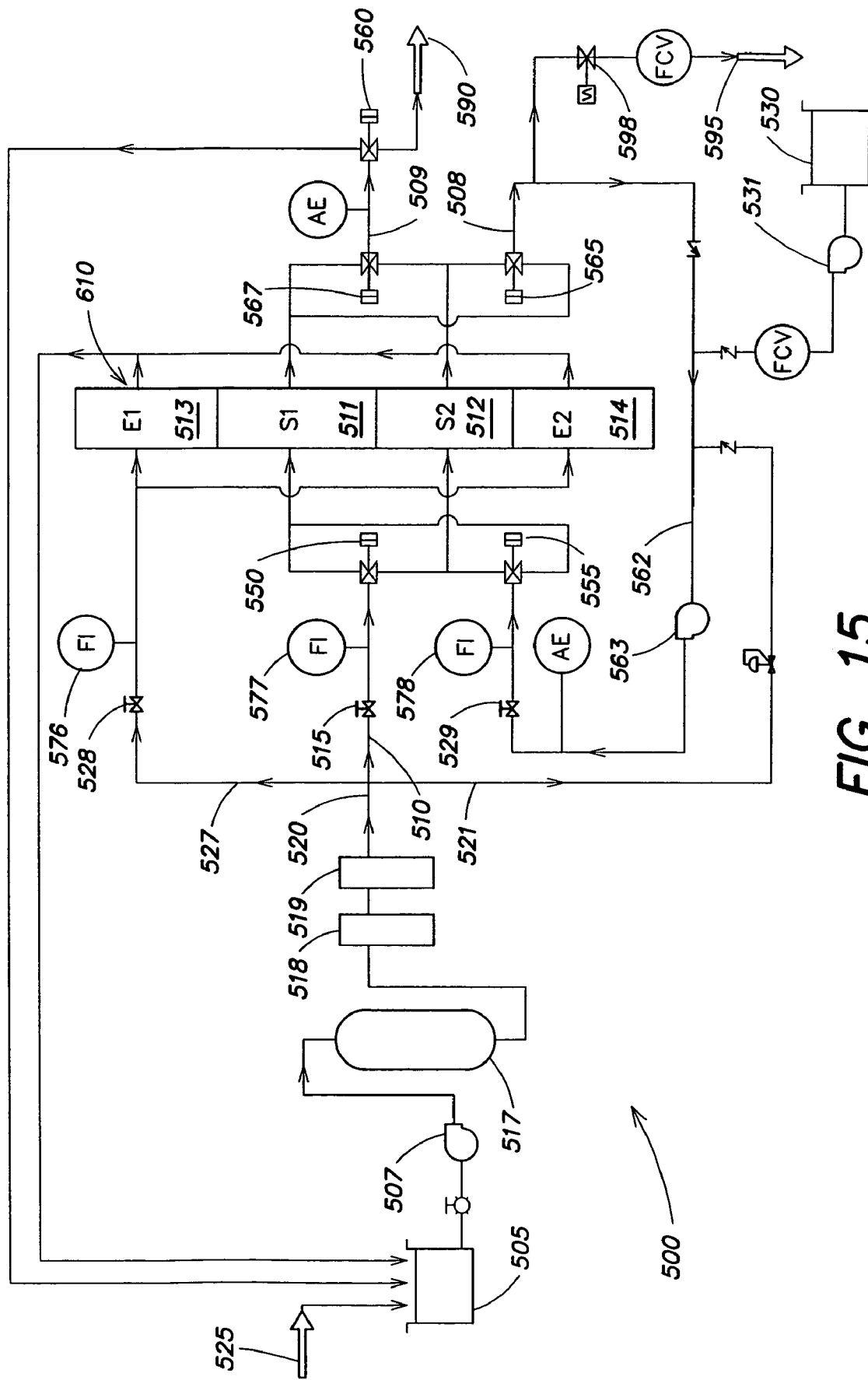
FIG. 15 is a schematic diagram illustrating an example of an electrical purification apparatus, in accordance with another embodiment of the invention.

Yet another example of an electrical purification apparatus is illustrated in FIG. 15. In this figure, electrical purification apparatus 500 is similar to the electrical purification apparatus depicted in FIG. 14. However, several additional recycle streams have been added. Liquid entering electrical purification apparatus 500 from point of entry 525 is fed into a holding tank 505. Liquid from holding tank 505 is pumped using pump 507 through optional filters 517, 518, and 519, to liquid stream 520. Additionally, rejects 597 and 599 from FIG. 14 have been eliminated, and the liquid streams feeding those rejects are now recycled to holding tank 505. Operation of electrical purification apparatus 500 is otherwise similar to that described previously. Using this system, very high water recoveries can be achieved.

It should be understood that the above descriptions are exemplary in nature, and many other configurations and variations are possible. For example, additional valves, inlets, pathways, reservoirs, surge tanks, outlets, sensors, activators, control systems, piping, filters, etc. may be used in an electrical purification apparatus of the invention, or the electrical purification apparatus may be combined and/or provided with other fluid purification techniques/systems and/or unit operations. For example, the electrical purification apparatus may be constructed and arranged to supply liquid to the electrodeionization device in the event of a failure of the source of energy and/or a loss of feed water flow to the electrodeionization device, for example, using a surge tank.

EXAMPLES

Non-limiting examples of modes of operation of certain electrical purification apparatuses/systems of the invention are now described. In one example, an electrodeionization device, having at least one diluting compartment and at least one concentrating compartment, each containing cation and anion resins, is provided.

Initially, the cation resins in both the dilute and concentrate compartments within the electrodeionization device are in a $Na^+$ form, and the anion resins are in a $Cl^-$ form. Feed liquid is introduced into both compartments. In some cases, the feed liquid is introduced into the diluting compartment at a higher flowrate relative to the concentrating compartment. For example, the feed liquid may be introduced into the diluting compartment at a flow rate about 2 times, about 3 times, about 5 times, about 7 times, about 10 times, etc. that of the flow rate introduced into the concentrating compartment. Simultaneously, a voltage is applied to the electrodeionization device to the diluting and concentrating compartments, as previously discussed.

In the diluting compartment, calcium ions are exchanged with sodium ions from the cation resins. For example, the cation resin may be chosen such that the selectivity of cation resins for the calcium ions is higher than for sodium ions, for instance, 3 to 6 times higher. The sodium ions released from the resin in the diluting compartment, along with those introduced in the feed, travel across the cation membrane into the concentrating compartment. Also in the diluting compartment, bicarbonate ions in the feed become at least partially exchanged with $Cl^-$ while some bicarbonate ions move across the anion membrane into the concentrating compartment, for example if the selectivity of the anion resins for bicarbonate ions is lower than for chloride ions. For instance, the anion resin may be chosen such that the selectivity for bicarbonate ions is about 2 or more times lower than for chloride ions. Additionally, some organics in the feed may be at least partially ion exchanged with the chloride ions from the anion resins, and/or at least partially physically adsorbed to the resin. Binding of the organics may also cause the release of chloride ions from the resins in some cases, as described above, which travel across the anion selective membrane into the concentrating compartment. Thus, the liquid exiting the diluting compartment will have relatively low or even undetectable levels of $Ca^{2+}$, bicarbonate ions and/or organics. Also, inside the diluting compartment, very low concentrations of $Ca^{2+}$ will be present in the liquid phase, relative to the amount absorbed by the resin.

Similar ion exchange processes occur in the concentrating compartment. If the flowrate of liquid into the concentrating compartment is low relative to the diluting compartment, then accordingly, relatively fewer ions will enter the concentrating compartment. For instance, if the flowrate of liquid through the concentrating compartment is $1/10$ of the diluting compartment as discussed above, the flow of ions would be $1/10$ that of the diluting compartment. In addition a certain amount of ions (e.g. $Na^+$, $HCO_3^-$, $Cl^-$, ionized organics) are transported from the diluting compartment into the concentrating compartment across the ion exchange membrane.

In the diluting compartment, as ion exchange proceeds, the resins become increasingly saturated with $Ca^{2+}$ and/or organics or other target species. At a certain level of saturation, "breakthrough" of one or more target ions (e.g., $Ca^{2+}$) may occur in the electrodeionization device, at which point, while the majority of $Ca^{2+}$ ions still get adsorbed by the cation exchange resin, a small amount of $Ca^{2+}$ ions begin to be present in solution. At breakthrough, the target ions in solution may move through the membrane into the concentrating compartment, and/or may be released in the product stream. In some cases, for example, if the electrical resistance of the cation resin when in $Ca^{2+}$ form is generally higher than when in $Na^+$ form, the electrical resistance of the cation resin will increase and the overall performance of the electrodeionization device will gradually decrease.

In certain cases where high levels of organics are present, the organics may cause fouling of the anion resin in one or both the diluting and concentrating compartments. Fouling of the anion resins within the electrodeionization device may cause the electrical resistance of the electrodeionization device to increase, which may result in a decrease in the transport of ions from the diluting compartment to the concentrating compartment, negatively affecting performance of the electrodeionization device.

When the quality of the liquid produced by the electrodeionization device decrease below a certain point, regeneration of the resin is initiated. The adsorption capacity of the resins within the electrodeionization device at this point will be reduced but not completely exhausted (e.g., regeneration may be commenced when breakthrough of $Ca^{2+}$ is observed and/or breakthrough of organics is observed). It should be noted that, in this example, an equilibrium state of the of the electrodeionization device is not reached (i.e., a state where no more net ion adsorption occurs by the resin), in which additional target species introduced into the electrodeionization device exit in either the dilute or concentrate outflow liquids. Thus, during operation of the electrodeionization device, a mass balance of ions entering and exiting the device is not reached, whereas at equilibrium, there is a mass balance between the target ions entering the electrodeionization device and the target ions exiting the electrodeionization device.

Regeneration

Non-reversal Process: In this example, both the resins in the diluting and concentrating compartments are regenerated. As previously described, a regeneration solution is passed through the diluting and concentrating compartments to regenerate the resin. The regeneration solution converts the cation resins to a $Na^+$ form, converts the anion resins to a $Cl^-$ form, and/or desorbs organics from the resins. Desorption of the organics may be achieved by ion exchange, and/or by mechanical desorption, e.g., by causing the resins to shrink and/or swell, thus causing organic compounds to be released from the resins.

Reversal Process: In this exemplary case, one compartment (or only one compartment for a given regeneration cycle or at a time) is regenerated. For example, only the concentrating compartment may be regenerated while product continues to be produced by the dilute compartment. After the concentrating compartment has been regenerated, the polarity of the voltage applied to the diluting and concentrating compartments is reversed and the streams are reversed such that the new dilute compartment is freshly regenerated (previously concentrating) compartment, and the new concentrating compartment is the former (unregenerated) dilute compartment. Regeneration may be initiated once the quality of the liquid produced by the electrodeionization device decreases below a certain point, and in some cases, multiple regenerations/regeneration solutions/techniques may be used.

Figure 18:
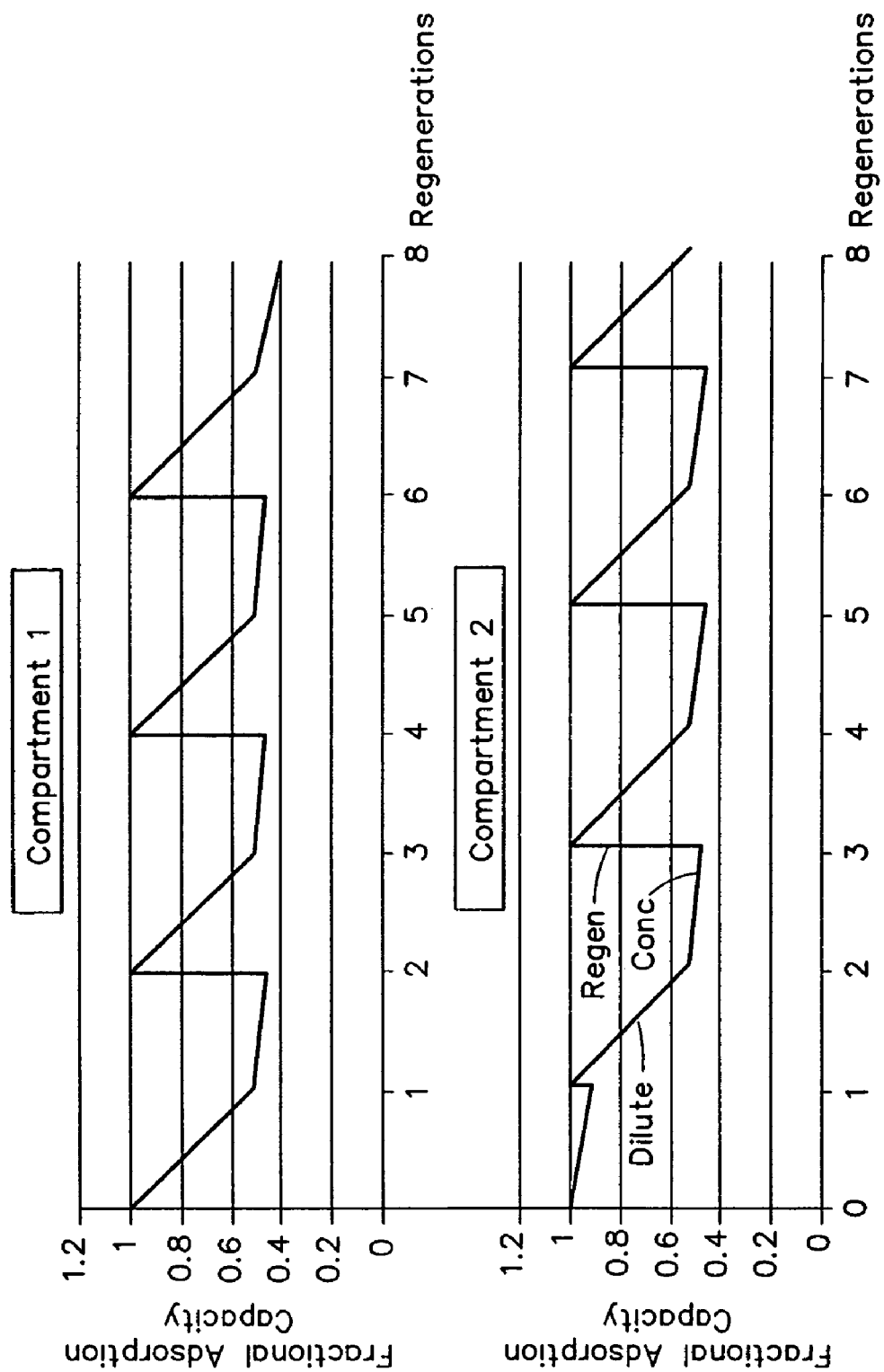
FIG. 18 is a graph illustrating one embodiment of the invention in which the fraction of remaining adsorption capacity for a target species changes as a function of time over a number of operating/regeneration cycles.
Figure 19:
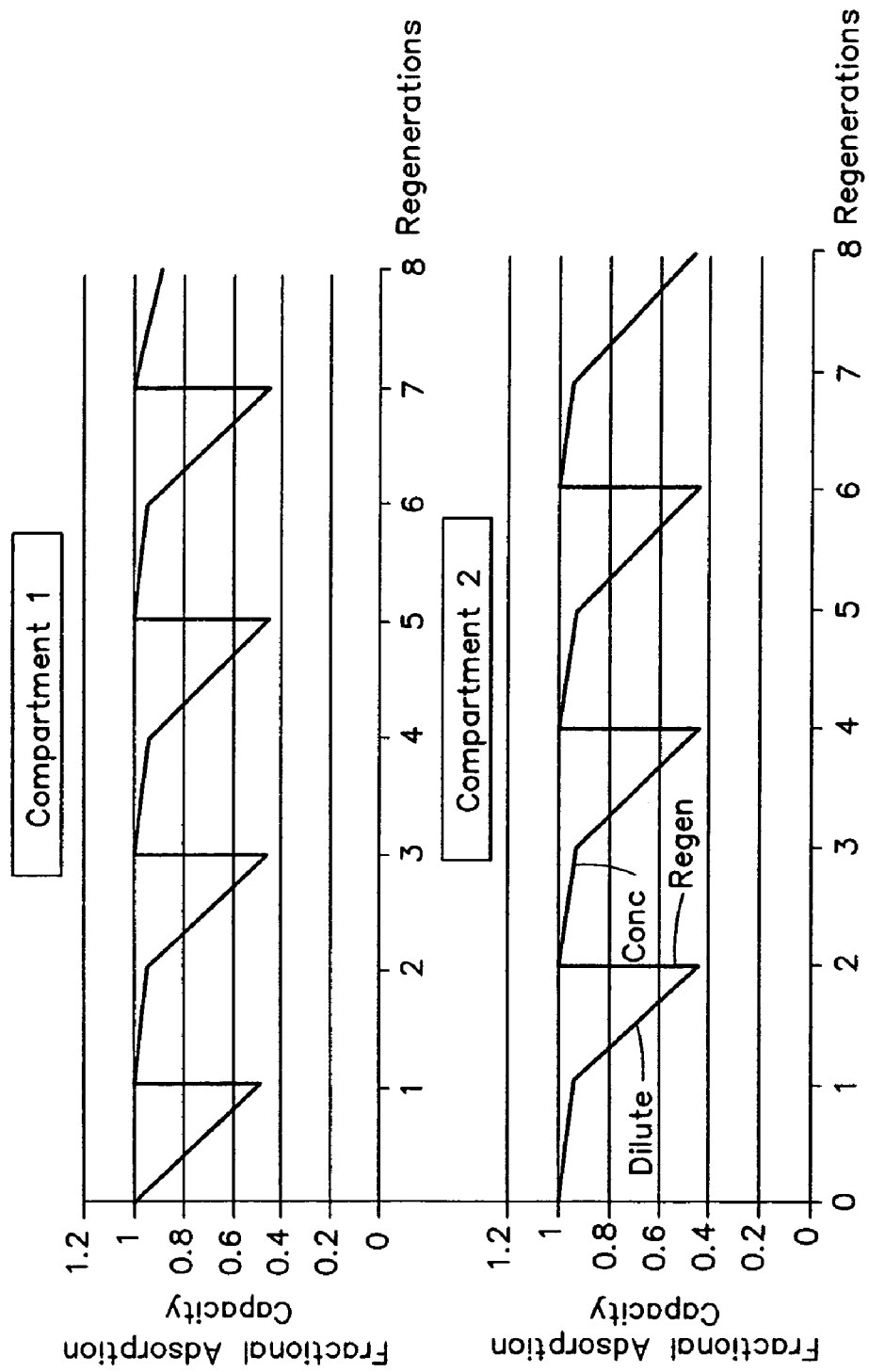
FIG. 19 is a graph illustrating another embodiment of the invention in which the fraction of remaining adsorption capacity for a target species changes as a function of time over a number of operating/regeneration cycles.

Non-limiting exemplary results of operating cycles including regenerations are shown in FIGS. 18 and 19 and are described below. FIG. 18 is a graph illustrating the fraction of remaining adsorption capacity for a target species as a function of time (measured by the number of regenerations). Before the first cycle, in the figure, compartment 1 was the diluting compartment, and compartment 2 was the concentrating compartment. After regeneration, the polarity of the electrodeionization device was reversed (i.e., compartment 1 became the concentrating compartment, and compartment 2 became the diluting compartment). However, in some cases, regeneration of the resins may also be initiated after polarity reversal, as is shown in FIG. 19. In either of these cases, the adsorption capacity of the resin for the target species does not reach a zero value, i.e., the electrodeionization device does not reach an equilibrium state during use of the device.

The following examples are intended to illustrate certain aspects of certain embodiments of the present invention, but do not exemplify the full scope of the invention.

Example 1

This example illustrates the use of an electrodeionization device, in accordance with one embodiment of the invention. An electrical purification apparatus, including an electrodeionization device, was assembled, having a configuration similar to that shown in FIG. 3. In this system, the electrodeionization device was set up to provide polarity reversal and to run essentially continuously. The electrodeionization device included 20 cell pairs (i.e., 20 pairs of adjacent concentrating and diluting compartments), with each cell having a thickness of about 0.23 cm (about 0.09 in), and a flow path length within each cell of about 66 cm (about 26 in). In each cell, liquid flows from the top of the cell, to the bottom of the cell; then, the liquid entered the next cell, at the bottom, and flows to the top. The operating conditions of the electrodeionization device were selected such that the device was able to produce a purified liquid at a product flow rate of about 2.27 l/min (about 0.6 gal/min). The inlet flow rate was about 2.84 l/min (about 0.75 gal/min), and the reject flow rate was about 0.57 l/min (about 0.15 gal/min). The water recovery rate was about 80%. The voltage applied to the electrodeionization device during operation was about 3 V/cell pair (about 60 V total). During operation of the electrical purification apparatus, resin within the electrodeionization device was regenerated using a 10 wt % NaCl solution for about thirty minutes once every three hours. The resin used was a mixture of SF120 and IRA450 resin, both from Rohm and Haas.

The feed stream was hard water having about 400 ppm of total dissolved salts ("TDS") including a hardness of about 170 mg/l (about 10 gr/gal of hardness), as follows: 170 ppm $Ca^{2+}$, 100 ppm $HCO^{3-}$, 70 ppm $Mg^{2+}$, 160 ppm $Na^+$, 50 ppm $SO_4^{2-}$, and 250 ppm $Cl^-$.

Figure 5:
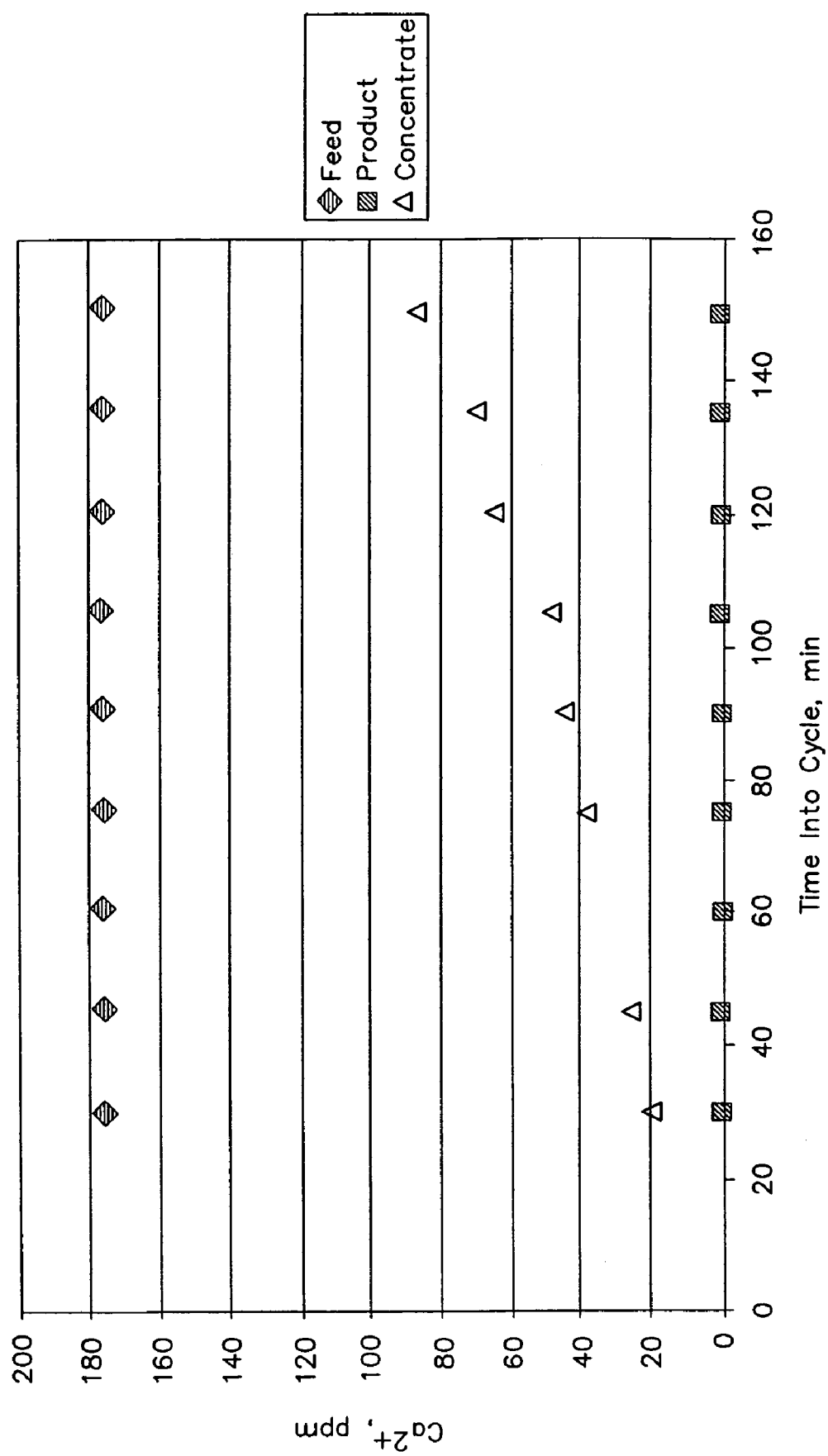
FIG. 5 is a graph illustrating, with respect to time, the concentration of $Ca^{2+}$ in the feed and product streams of an electrodeionization device of the invention, according to one embodiment of the invention.
Figure 6:
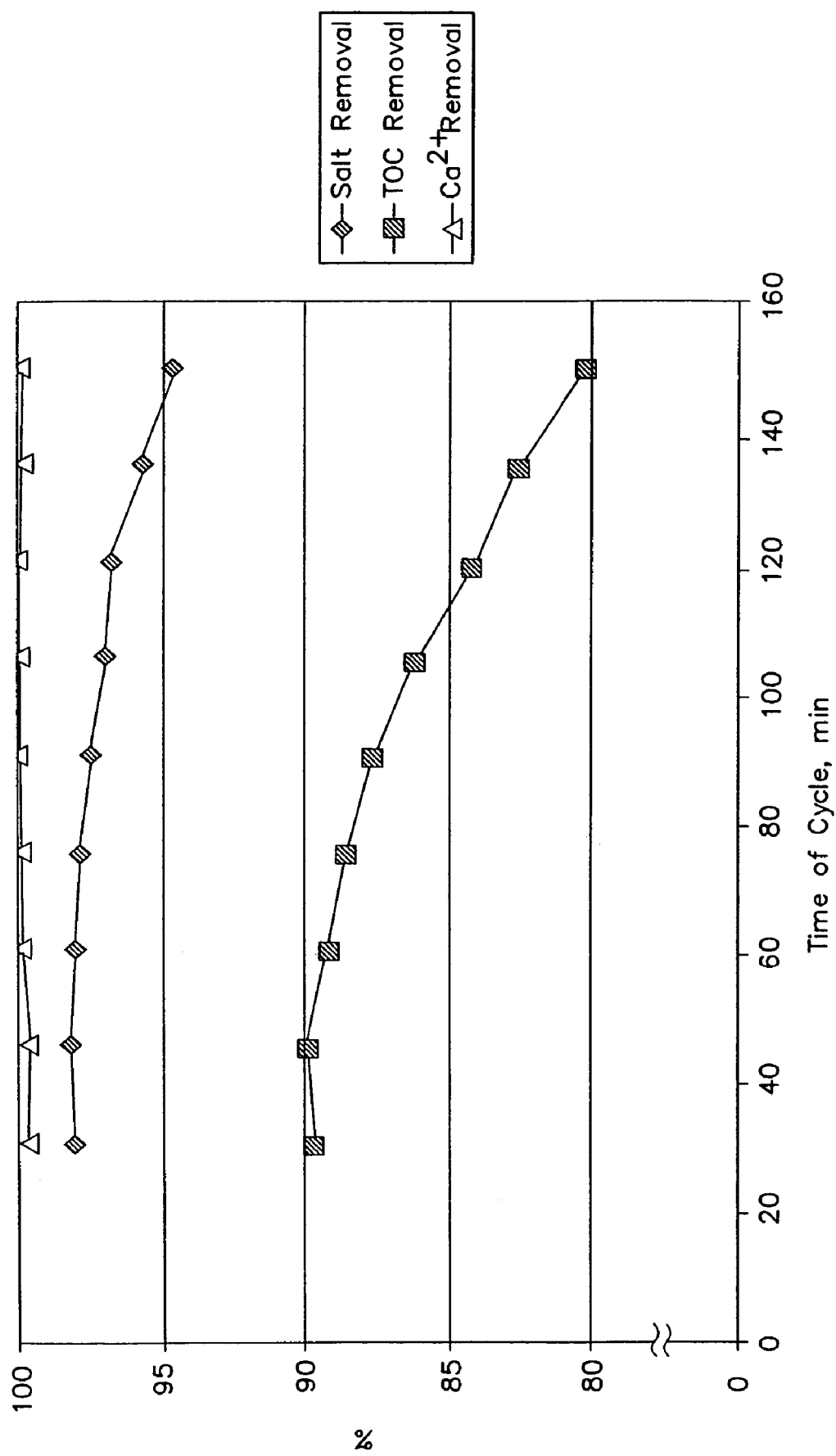
FIG. 6 is a graph illustrating the removal of various species from a liquid being purified in an electrodeionization device of the invention.

Data from an experiment using this electrical purification apparatus are shown in FIGS. 5 and 6 for a typical cycle of the run (about 3 hours). In FIG. 5, dissolved calcium concentrations are shown during the experiment for the "feed" stream (liquid 120 in FIG. 3, entering from point of entry 125), "product" stream (i.e., a purified stream, represented as liquid 370 in FIG. 3 exiting to point of use 390), and "concentrate" stream (i.e., water for disposal, represented as liquid 380 in FIG. 3 exiting to point of use 395). The feed stream was maintained at a constant $Ca^{2+}$ concentration of about 170 ppm during the entire run. During operation, the electrical purification apparatus was able to maintain the product stream at a constant, nearly zero level of $Ca^{2+}$ during the entire run (i.e., below detection limits), thus showing the effectiveness of the apparatus in removing $Ca^{2+}$ from the feed stream. At least a portion of the $Ca^{2+}$ removed by the electrical purification apparatus appeared in the concentrate stream and can be disposed of, etc. as necessary. In FIG. 5, this can be seen as increasing concentrations of $Ca^{2+}$ in the concentrate. When the concentration of $Ca^{2+}$ reaches a certain level (e.g., 100 ppm), regeneration of the resin can be initiated.

FIG. 6 illustrates the effectiveness of the electrical purification apparatus in removing salt, TOC and $Ca^{2+}$ from the inlet feed stream for the same experiment. The amount of removal of each species (salt, TOC, $Ca^{2+}$) is expressed in FIG. 6 as the percentage of the species removed from the feed as indicated by the amount of the species measured in the product stream. During the experiment, the removal of $Ca^{2+}$ from the feed by the electrical purification apparatus remained very high, substantially close to 100%. The removal of salt and TOC from the feed stream by the electrical purification apparatus also remained high, ranging between about 95% and about 98% removal of salt, and between about 80% and about 90% removal of TOC.

Thus, this example shows that an electrical purification apparatus of the invention is able to efficiently remove hardness ions, salts, and organics from a feed stream.

Example 2

Figure 7:
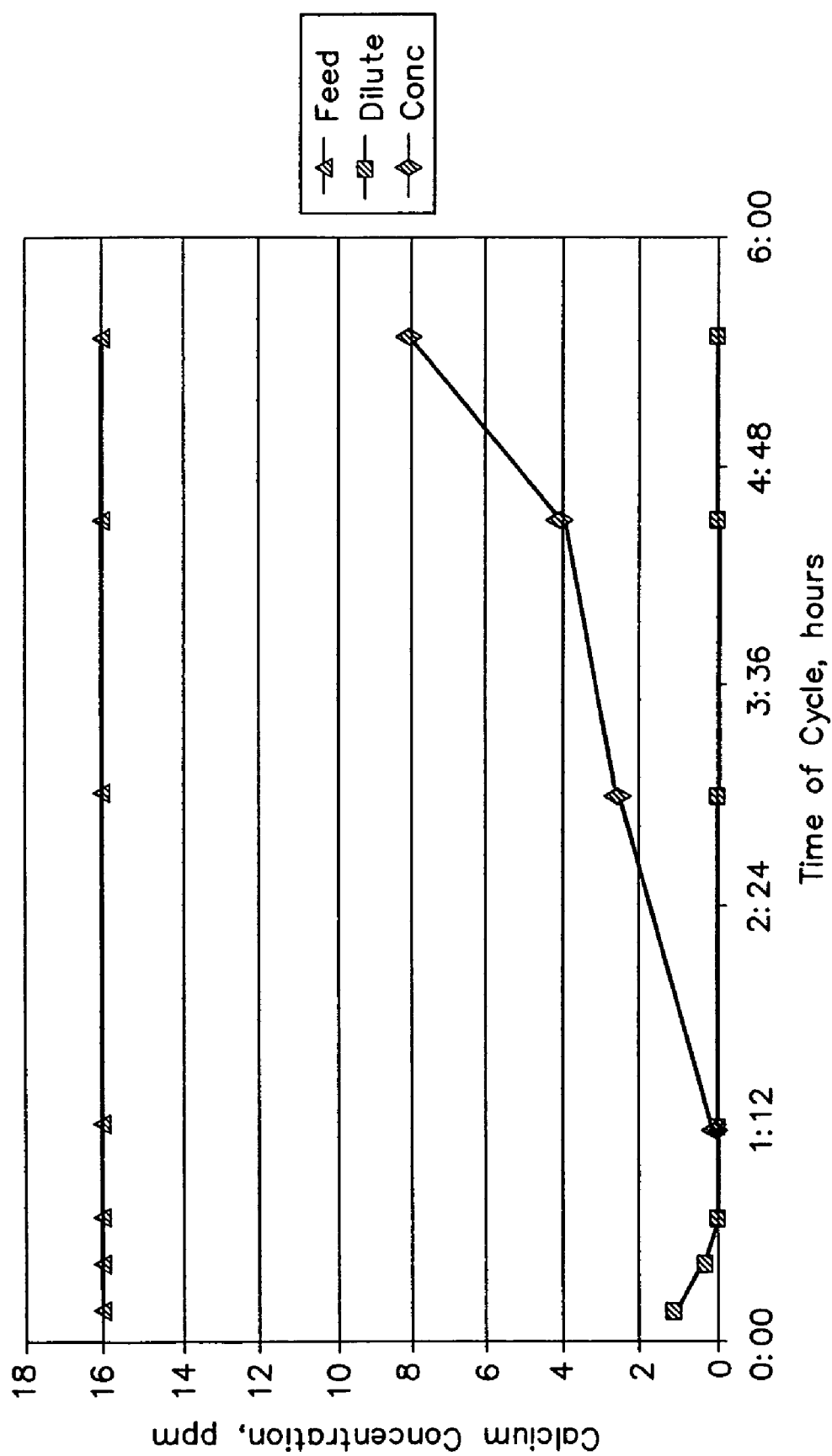
FIG. 7 is a graph illustrating the removal of $Ca^{2+}$ with respect to time in an electrodeionization device of the invention.

FIG. 7 illustrates another experiment using a similar electrical purification apparatus as the one described in Example 1 and illustrated in FIG. 3, but, compared with the operating conditions of Example 1, in the present example, the system was operated with a somewhat lower concentration of $Ca^{2+}$ in the feed stream, about 16 ppm. The remaining ion concentrations were as follows: 100 ppm $HCO^{3-}$, 70 ppm $Mg^{2+}$, 160 ppm $Na^+$, 50 ppm $SO_4^{2-}$, and 96 ppm $Cl^-$. The regeneration solution was 10 wt % NaCl, applied for 30 minutes to the resin every six hours. An experiment was performed for about 6 hours, and some of the data from one cycle of the experiment are presented in FIG. 7.

It was observed that, while the concentration of $Ca^{2+}$ in the feed remained constant during the experiment at about 16 ppm, the electrical purification apparatus was able to remove nearly all $Ca^{2+}$ from the feed stream, resulting in a product ("dilute") stream, generally having a negligible concentration of $Ca^{2+}$ (i.e., below detection limits). Some of the $Ca^{2+}$ removed from the feed stream by the electrical purification apparatus was found to have appeared in the disposal ("conc") stream.

Thus, in this example, an electrical purification apparatus of the invention was demonstrated to exhibit a high ability to remove hardness ions and organics from a feed stream for extended periods of time.

Example 3

This example illustrates the essentially continuous use of certain electrical purification apparatuses, according to various embodiments of the invention. An electrical purification apparatus was assembled, similar to the one illustrated in FIG. 3. The electrical purification apparatus included an electrodeionization device, which included five pairs of cells (i.e., five pairs of concentrating and diluting compartments). Each of the cells had a thickness of about 0.23 cm (about 0.09 in), and a flow path length of about 38 cm (about 15 in). The operating conditions of the electrodeionization device were set such that the device was able to produce a product flow rate of about 0.4 l/m. The voltage applied to the electrodeionization device during operation was about 3 V/cell pair (about 30 V total). The feed stream introduced into the electrical purification apparatus was hard water including about 200 ppm of TDS, including a hardness of about 17 mg/l of $CaCO_3$ (about 1 gr/gal hardness).

Figure 8:
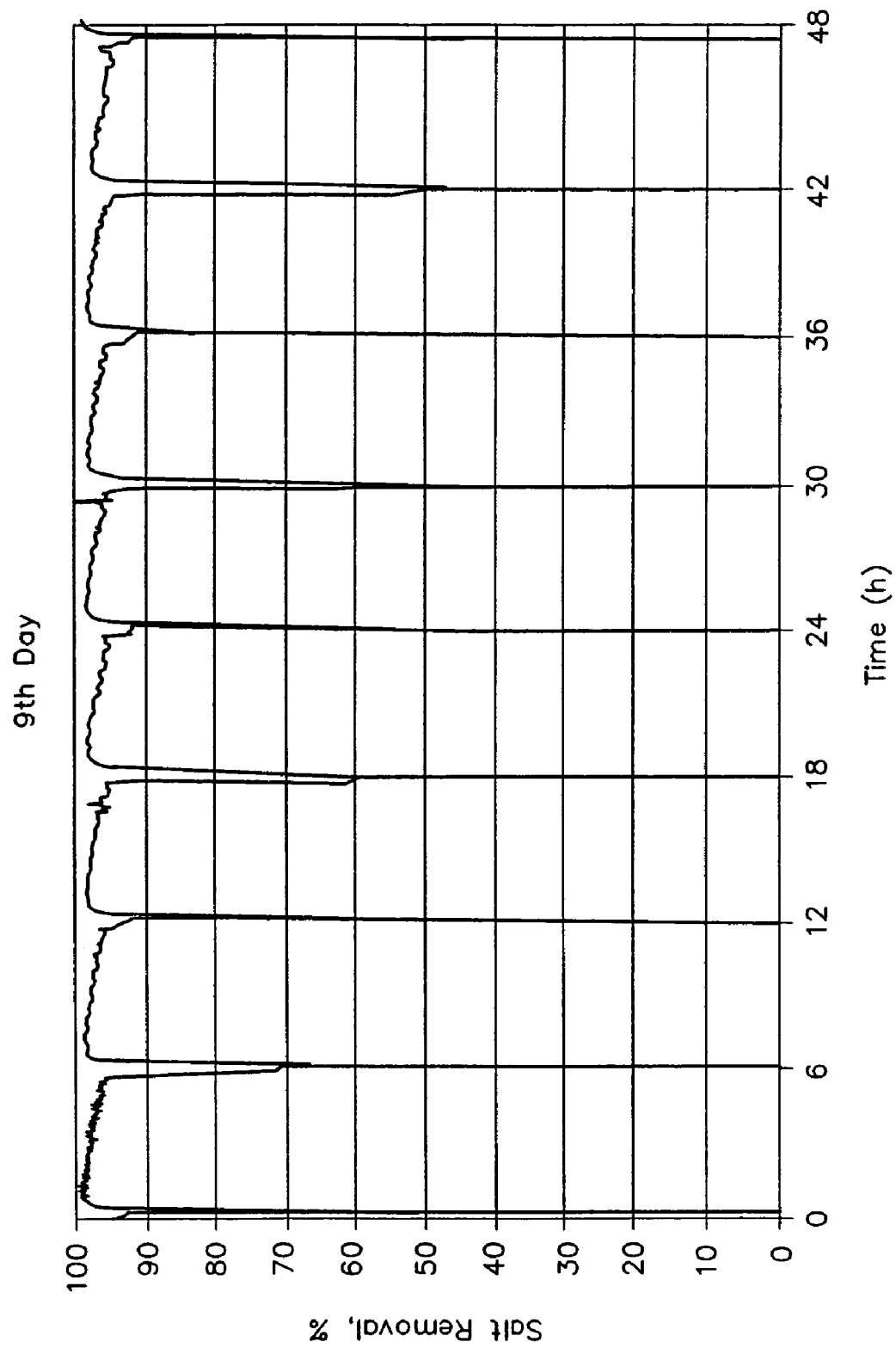
FIG. 8 is a graph illustrating the removal of salt from a liquid being purified in an example electrodeionization device of the invention on the 9$^{th}$ day of operation of the electrodeionization device.
Figure 9:
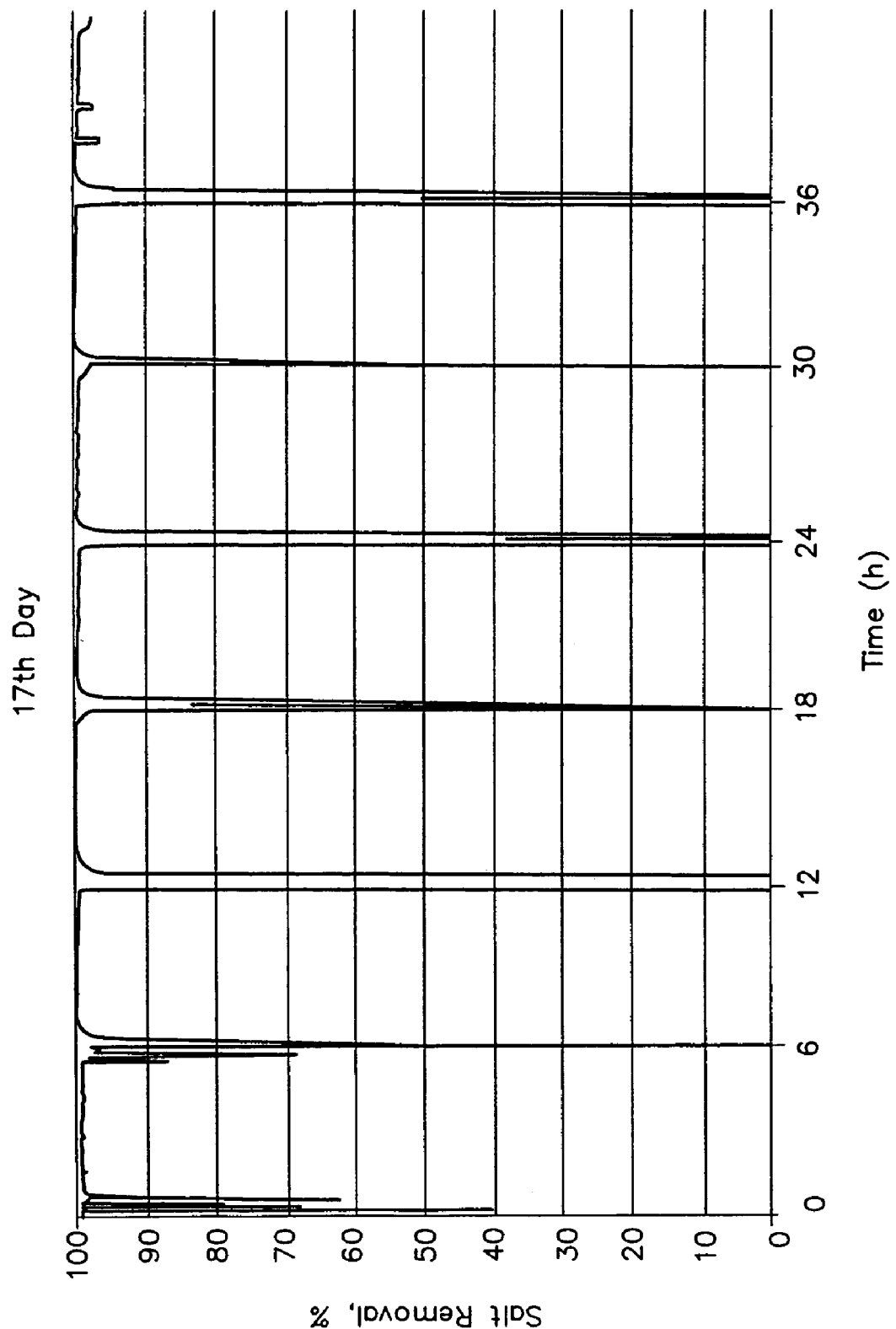
FIG. 9 is a graph illustrating the removal of salt from a liquid being purified in an example electrodeionization device of the invention on the 17$^{th}$ day of operation of the electrodeionization device.

In the electrical purification apparatus, resin within the electrodeionization device was regenerated for about thirty minutes using a concentrated salt solution every six hours during essentially continuous operation by reversing the voltage polarity within the electrodeionization device, as well as the inlets of the feed and regeneration streams into the electrodeionization device. In each cell, liquid flows from the top of the cell, to the bottom of the cell; then, the liquid entered the next cell, at the bottom, and flows to the top. The regeneration solution was 10 wt % NaCl, applied for 30 minutes. Between regeneration cycles, the electrodeionization device was used to purify the feed stream, as in a manner similar to that previously described in Example 1. Data illustrating NaCl removal from the feed stream from experiments using inventive regeneration of the media are shown in FIGS. 8 and 9. The data in these figures is plotted as the percentage of the amount of salt removed from the product stream, as compared to the amount in the feed stream, with respect to time.

FIG. 8 illustrates data for an experiment where the electrodeionization device was filled with SF-120 cation resin and IRA-458 anion resin (Rohm and Haas Company, Philadelphia, Pa.). Data is presented from the ninth and tenth days of essentially continuous operation of the electrical purification apparatus (the electrical purification apparatus was maintained under the same operating conditions for the preceding days, including the periodic reversal of polarity as described above, data not shown). The percentage of salt removal during the ninth and tenth days remained very high, typically greater than about 95%, except for brief periods where the resin was recharged using a concentrated salt solution. These brief periods appear on the graph every six hours, when the resin was regenerated for thirty minutes. Similar salt removal data (not shown) for days 1-8 were also observed.

FIG. 9 illustrates another experiment in which the electrodeionization device was filed with SST-60 cation resin and A-860 anion resin (Purolite, Bala Cynwyd, Pa.). Data is presented from the seventeenth day of essentially continuous operation of the electrical purification apparatus. These resins also showed a high percentage of salt removal, even after essentially continuous operation for more than seventeen days. Typically, the percentage of salt removal remained greater than about 98% during the course of the experiment, except for regeneration periods when the resin was recharged using a concentrated salt solution. As before, the resin was regenerated for 30 minutes every six hours. Data for days 1-16 (not shown) illustrate similar salt removal characteristics for the electrical purification apparatus.

Thus, this example shows that an electrical purification apparatus of the invention can be used on an essentially continuous basis for extended periods of time.

Example 4

This example illustrates the removal of $Ca^{2+}$ from an example of an electrodeionization device of the invention, with and without regeneration of the media within the electrodeionization device. In this example, feed water having a $Ca^{2+}$ concentration of about 105 ppm was introduced into an electrodeionization device having a configuration similar to that shown in FIG. 3. The electrodeionization device was set up to provide polarity reversal. The inlet flow rate was about 3 l/min (about 0.8 gal/min). Other conditions are similar to those described in Example 1. The resin was regenerated by exposing the resin to a 10 wt % NaCl solution for about thirty minutes.

Figure 10:
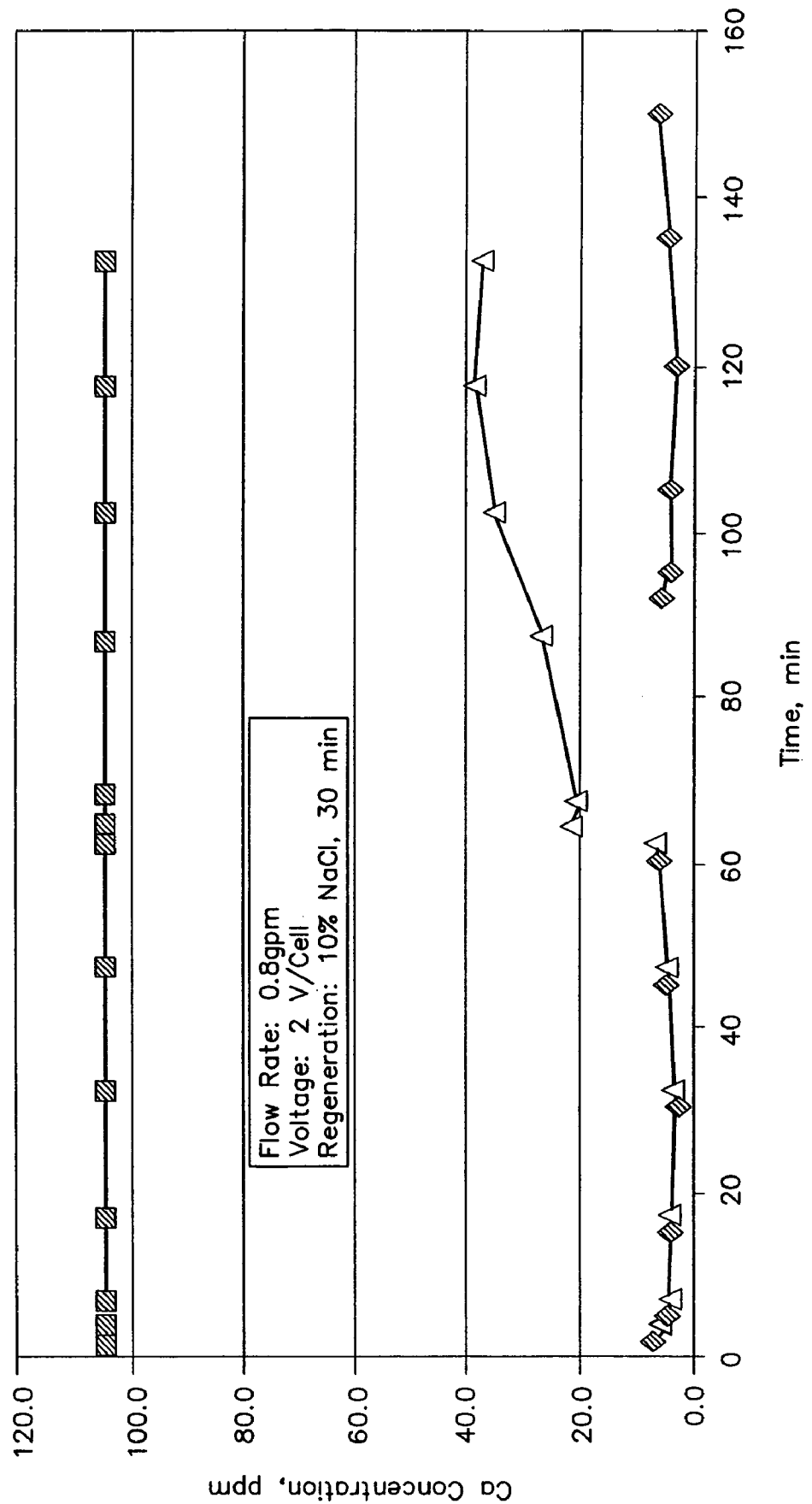
FIG. 10 is a graph illustrating the removal of $Ca^{2+}$ from an example electrodeionization device of the invention, with and without regeneration of the media.

$Ca^{2+}$ concentration data from an experiment using this electrodeionization device are shown in FIG. 10, for two separate experiments, each using fresh resin (i.e., not previously used). In the first experiment, the resin was regenerated as described above after 1 hour of purification of the feed water (indicated by solid diamonds). The 30-minute gap in the data, starting at about 60 minutes, indicates when resin regeneration was performed and the polarity of the electrodeionization device was reversed. In the second experiment, fresh resin was used to purify the feed water, but regeneration was not performed (indicated by hollow triangles). The short break in the data at about 60 minutes indicates where the polarity of the electrodeionization device was reversed. Also plotted in FIG. 10 is the feed concentration for these experiments (indicated by solid squares). The concentration of $Ca^{2+}$ in the feed water stayed constant throughout each experiment.

The $Ca^{2+}$ concentration found in the product after resin regeneration and polarity reversal was found to be significantly lower as compared to the $Ca^{2+}$ concentration in a similar experiment where polarity reversal occurred but the resin was not regenerated upon exposure to a salt solution. Thus, regeneration of the resin within the electrodeionization device improved $Ca^{2+}$ removal. Further, the concentration of $Ca^{2+}$ within the product, after polarity removal and resin regeneration was found to be comparable to fresh resin, as seen in FIG. 10.

Example 5

This example illustrates the use of an electrodeionization device of the invention for extended periods of time. An electrical purification apparatus was prepared, having a configuration similar to that illustrated in FIG. 15. The system was fed with hard water (a hardness of about 150 ppm as $CaCO_3$, an alkalinity of about 100-175 $CaCO_3$ and a conductivity of about 500 to about 700 microSiemens/cm).

Figure 16:
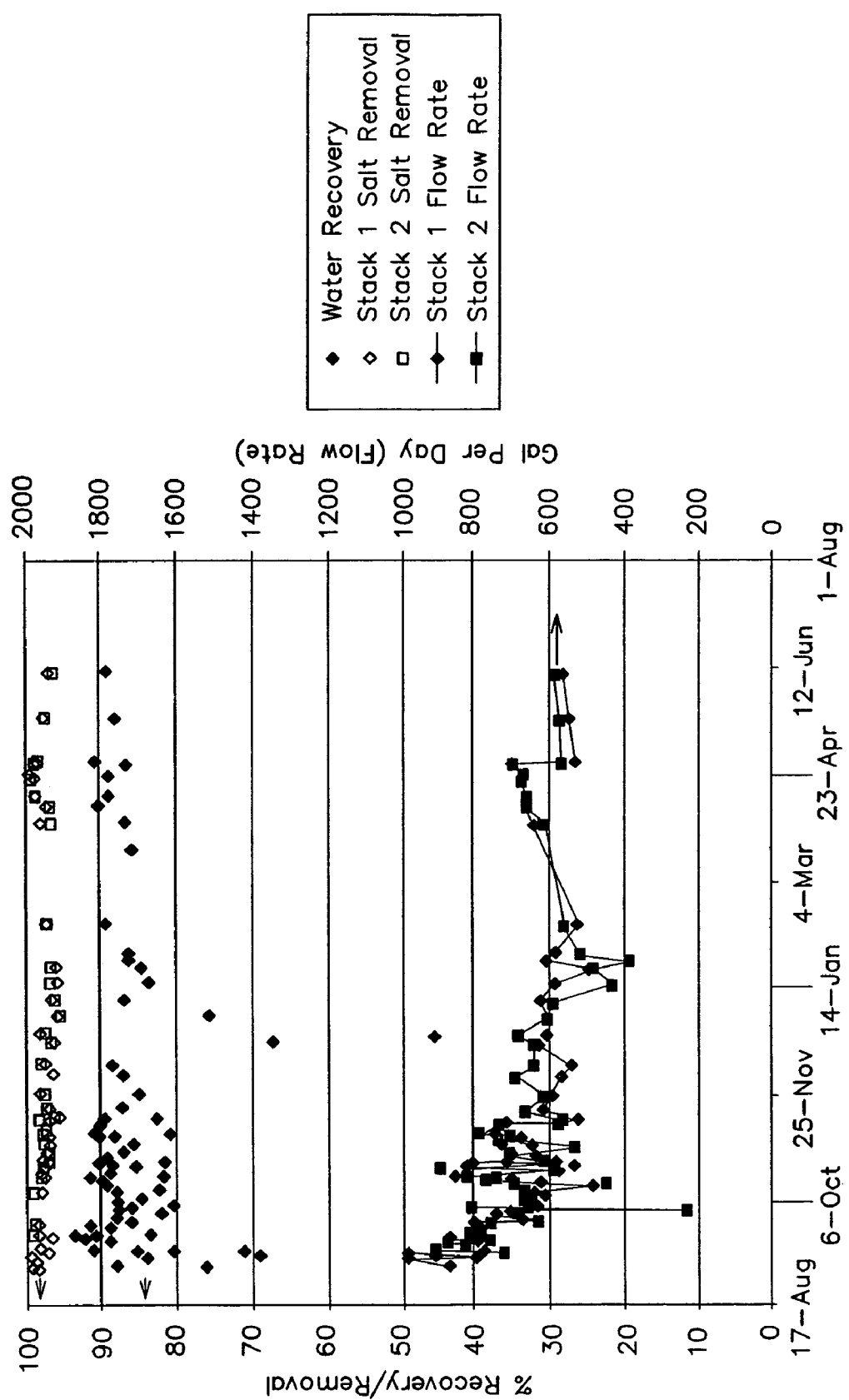
FIG. 16 is a graph illustrating the removal of salt with respect to time in an electrodeionization device, according to one embodiment of the invention.

Performance data for this system is illustrated in FIG. 16, covering over nine months of operation. In this figure, the salt removal shown is the average number for the cycle, when product liquid is produced (about nine hours between salt regenerations). The water recovery shown in the graph is the ratio between the volume of product water produced by the electrodeionization device, divided by the total amount of liquid fed to the system. The setpoint for the conductivity of the product was set at 30 microSiemens/cm. Any water produced that had a conductivity greater than this amount was returned to the feed tank and not counted as product. Readings were taken periodically, roughly once every three to four days.

Figure 17:
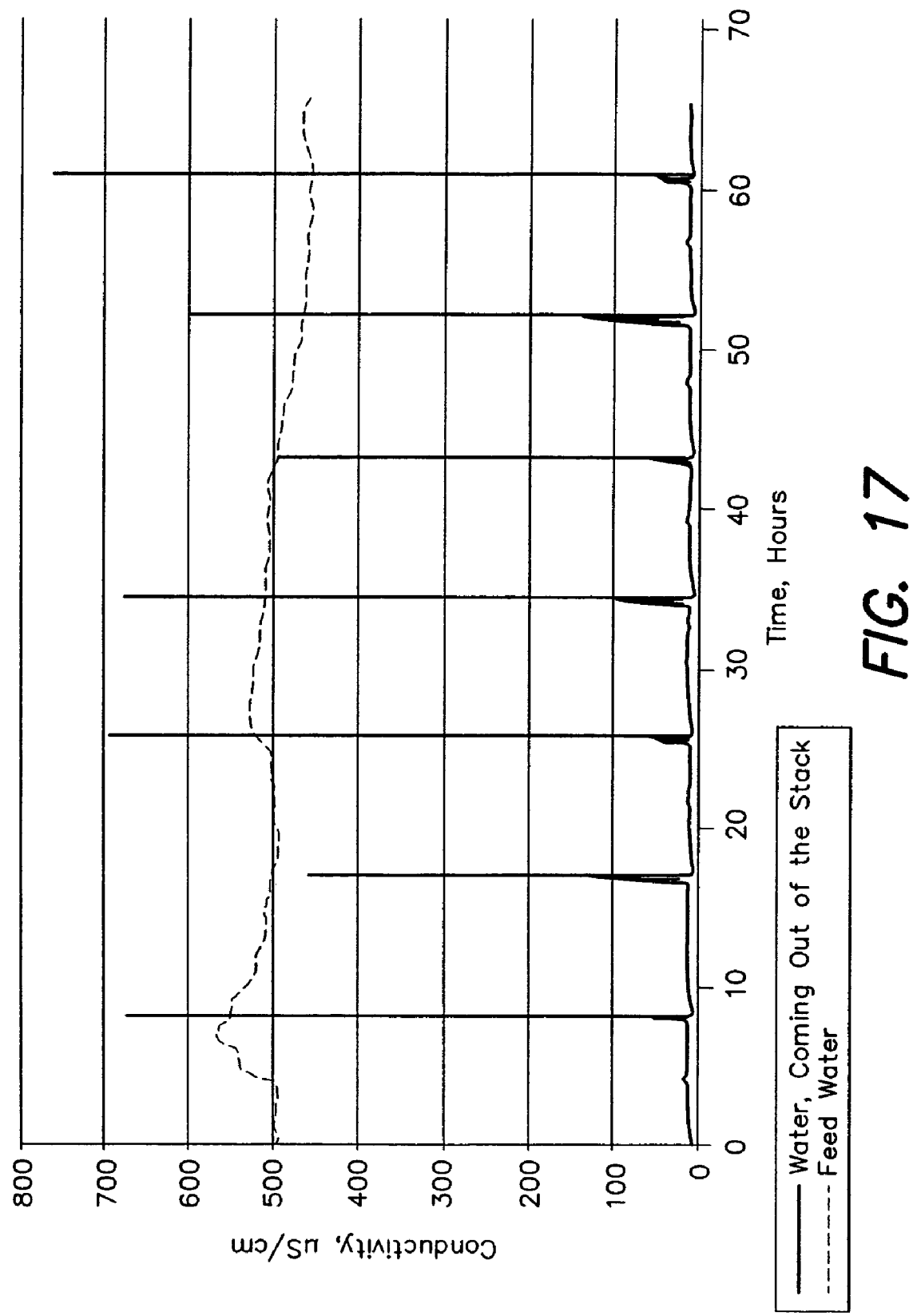
FIG. 17 is a graph illustrating the removal of salt with respect to time in an electrodeionization device, according to another embodiment of the invention.

In FIG. 17, the conductivity of water introduced into the electrodeionization device, and water exiting the electrodeionization device as purified water is shown over a time course of several cycles as an example of the performance of the device. The spikes shown in FIG. 17 are the times when the electrode polarity within the electrodeionization device was reversed, temporarily resulting in water having a conductivity exceeding the set point. As discussed above, this water was recycled to the feed tank, and not used as product liquid.

As an example of the typical water produced using this apparatus, for a feed liquid having a conductivity of 545 microSiemens/cm, a TOC of 1.56 ppm, and a calcium concentration of 67 ppm, in one experiment, the product liquid had a conductivity of 5.8 microSiemens/cm, a TOC of 0.23 ppm, and calcium ion concentrations below the detection limit. In another experiment, the product water had a conductivity of 6.3 microSiemens/cm, a TOC of 0.24 ppm, and a calcium concentration below the detection limit.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one act, the order of the acts of the method is not necessarily limited to the order in which the acts of the method are recited.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the U.S. Patent Office Manual of Patent Examining Procedures, Section 2111.03.

What is claimed is:

1. A method comprising:
   introducing water to be treated comprising a first target species and a second target species into an electrodeionization device having a depleting compartment and a concentrating compartment having adsorption media contained therein;
   promoting adsorption of the first target species and the second target species on the adsorption media;
   measuring a concentration of at least the first target species in an effluent stream from the concentrating compartment;
   initiating displacement of at least a portion of the adsorbed first target species by introducing a first regenerant species into contact with the adsorption media in response to an increase in the concentration of the at least first target species measured in the effluent stream; and
   initiating displacement of at least a portion of the adsorbed second target species by introducing a second regenerant species into contact with the adsorption media subsequent to introducing the first regenerant species.

2. The method of claim 1, wherein promoting adsorption of the at least one target species comprises applying an electric field through the electrodeionization device.

3. The method as in claim 2, wherein promoting adsorption of the at least one target species comprises reversing a polarity of the electric field through the electrodeionization device.

4. The method as in claim 2, wherein displacing at least a portion of the adsorbed target species is performed while introducing water to be treated into the electrodeionization device and while applying the electric field.

5. The method as in claim 2, further comprising introducing a desorption liquid into the concentrating compartment.

6. The method as in claim 1, wherein the at least one selected target species comprises at least one of $Ca^{2+}$ and $Mg^{2+}$.

7. The method as in claim 1, further comprising monitoring a parameter of an effluent stream from the concentrating compartment.

8. The method as in claim 7, wherein displacing at least a portion of the adsorbed target species is performed when the adsorption media has a saturation condition of less than 75% of a maximum adsorption capacity for the adsorbed target species.

9. The method as in claim 8, wherein displacing at least a portion of the adsorbed target species is performed when the saturation condition is at less than 20%.

10. The method as in claim 7, wherein monitoring the parameter of the effluent stream comprises measuring a resistivity thereof.

11. The method as in claim 10, wherein displacing at least a portion of the adsorbed target species is initiated while the measured resistivity is decreasing.

12. The method as in claim 7, wherein monitoring the parameter of the effluent stream comprises measuring a concentration of the target species in the effluent.

13. The method as in claim 1, wherein the concentrating compartment contains at least one of cation exchange media and anion exchange media.

14. The method as in claim 1, wherein introducing water to be treated comprises introducing water comprising at least one organic species into the electrodeionization device.

15. The method as in claim 1, wherein displacing at least a portion of the adsorbed target species is performed until at least about 50% of the target species has been desorbed from the adsorption media.

16. A method of regenerating adsorption media in an electrodeionization device, comprising:
    promoting adsorption of a first target species and a second target species from water to be treated onto the adsorption media comprised of a mixture of cation exchange resin and anion exchange resin in the electrodeionization device; measuring a concentration of the first target species in a stream within an inlet or an outlet of the electrodeionization device to provide a measured concentration of the first target species;
    exposing the adsorption media to a first desorption liquid comprising a regenerant species at a first concentration in response to the measured concentration of the first target species, the desorption liquid able to remove the first target species from the adsorption media; and
    exposing the adsorption media to a second desorption liquid comprising the regenerant species at a second concentration, the desorption liquid able to remove the second target species from the adsorption media.

17. The method as in claim 16, wherein exposing the adsorption media to the first desorption liquid comprises contacting the adsorption media to a liquid having dissolved $Na^+$.

18. The method as in claim 16, wherein exposing the adsorption media to the first desorption liquid comprises contacting the adsorption media to a liquid having dissolved $Cl^-$.

19. The method as in claim 16, wherein promoting adsorption of the target species onto the adsorption media comprises applying an electric field through the electrodeionization device.

20. The method as in claim 19, wherein the second regenerant species comprises a salt and the second concentration of the salt in the second desorption liquid is greater than about 5 wt %.

21. The method as in claim 16, wherein exposing the adsorption media to the first desorption liquid comprises displacing an anionic target species.

22. A system, comprising:
    an electrodeionization device having a mixture of cationic and anionic exchange media contained in a compartment thereof;
    a source of a first desorption liquid fluidly connectable to the compartment of the electrodeionization device, the first desorption liquid comprising at least one regenerant species having a first concentration;
    a source of a second desorption liquid comprising a regenerant species having a second concentration, the source of the second desorption liquid fluidly connectable to the compartment of the electrodeionization device;
    a sensor configured to provide a representation of a property of a liquid in or from the electrodeionization device; and
    a controller in communication with the sensor and configured to receive the representation of the property of the liquid and, when the property of the liquid is at a certain threshold level, generate a first output signal that facilitates introducing the first desorption liquid into the compartment to promote desorption of a first target ion adsorbed on the media, and generate a second output signal that facilitates introducing the second desorption liquid into the compartment to promote desorption of a second target ion adsorbed on the media.

23. The system as in claim 22, wherein the certain threshold level corresponds to a saturation condition of less than 75% of a maximum adsorption capacity of the media for an adsorbed target species.

24. The system of claim 22, wherein the first desorption liquid comprises a salt having a concentration of below 4 weight percent.

25. The system of claim 24, wherein the second desorption liquid comprises a salt having a concentration at least about 4 weight percent.

26. The system of claim 22, wherein the first target ion comprises at least one of $Ca^{2+}$ and $Mg^{2+}$.

* * * * *

UNITED STATES PATENT AND TRADEMARK OFFICE
CERTIFICATE OF CORRECTION

PATENT NO. : 7,658,828 B2  
APPLICATION NO. : 11/104791  
DATED : February 9, 2010  
INVENTOR(S) : Freydina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Thirtieth Day of November, 2010

David J. Kappos  
*Director of the United States Patent and Trademark Office*